(12) United States Patent
Benke et al.

(10) Patent No.: US 7,417,554 B2
(45) Date of Patent: Aug. 26, 2008

(54) WIRELESS SYSTEM FOR ONE OR MORE ELECTRICAL SWITCHING APPARATUS

(75) Inventors: James J. Benke, Pittsburgh, PA (US); Joseph C. Engel, Monroeville, PA (US); James L. Lagree, Robinson Township, PA (US); Charles J. Luebke, Sussex, WI (US); Mark G. Solveson, Oconomowoc, WI (US)

(73) Assignee: Gaton Corporation, Cleveland, OH (US)

( * ) Notice: Subject to any disclaimer, the term of this patent is extended or adjusted under 35 U.S.C. 154(b) by 268 days.

(21) Appl. No.: 11/338,349

(22) Filed: Jan. 24, 2006

(65) Prior Publication Data

US 2006/0119344 A1 Jun. 8, 2006

Related U.S. Application Data

(63) Continuation-in-part of application No. 11/038,899, filed on Jan. 19, 2005, now Pat. No. 7,253,602, which is a continuation-in-part of application No. 10/962,682, filed on Oct. 12, 2004, now Pat. No. 7,145,322.

(51) Int. Cl.
*G08B 21/00* (2006.01)
(52) U.S. Cl. .............. 340/638; 340/652; 340/644; 340/649; 361/42
(58) Field of Classification Search .......... 340/638, 340/652, 641, 644, 649, 538, 653, 657, 686.1; 361/64, 65, 66, 42; 324/126
See application file for complete search history.

(56) References Cited

U.S. PATENT DOCUMENTS

| | | | |
|---|---|---|---|
| 4,556,882 A * | 12/1985 | Brifman et al. ......... 340/3.44 |
| 5,638,296 A * | 6/1997 | Johnson et al. ......... 700/286 |
| 5,909,180 A * | 6/1999 | Bailey et al. .......... 340/639 |
| 5,936,817 A * | 8/1999 | Matsko et al. ......... 361/72 |
| 6,002,560 A | 12/1999 | Nguyen et al. |
| 6,055,757 A * | 5/2000 | Carlsson ............... 40/790 |
| 6,150,625 A | 11/2000 | Marchand et al. |
| 6,157,527 A * | 12/2000 | Spencer et al. ......... 361/64 |
| 6,167,329 A * | 12/2000 | Engel et al. ........... 361/93.2 |
| 6,466,023 B2 | 10/2002 | Dougherty et al. |
| 6,522,247 B2 | 2/2003 | Maruyama et al. |
| 6,628,496 B2 * | 9/2003 | Montjean .............. 361/115 |
| 6,788,512 B2 * | 9/2004 | Vicente et al. ......... 361/93.1 |
| 6,884,998 B2 | 4/2005 | Nichols |
| 2001/0048375 A1 | 12/2001 | Maruyama et al. |
| 2002/0107615 A1 | 8/2002 | Bjorklund |
| 2004/0113070 A1 | 6/2004 | Nichols |
| 2005/0063107 A1 | 3/2005 | Benke |
| 2005/0168891 A1 | 8/2005 | Nilman-Johansson et al. |

* cited by examiner

*Primary Examiner*—Toan Pham
(74) *Attorney, Agent, or Firm*—Martin J. Moran

(57) ABSTRACT

A system displays information from and controls electrical switching apparatus, such as circuit breakers. The system includes a plurality of circuit breakers having separable contacts and a plurality of conditions, such as bus temperature and contact wear. A plurality of sensors are structured to sense the conditions of the circuit breakers and to communicate the sensed conditions over corresponding wireless signals. A display and control unit is operatively associated with the circuit breakers and is structured to receive the corresponding wireless signals and display information corresponding to the sensed conditions or to control the circuit breakers based upon one or more of the sensed conditions.

24 Claims, 15 Drawing Sheets

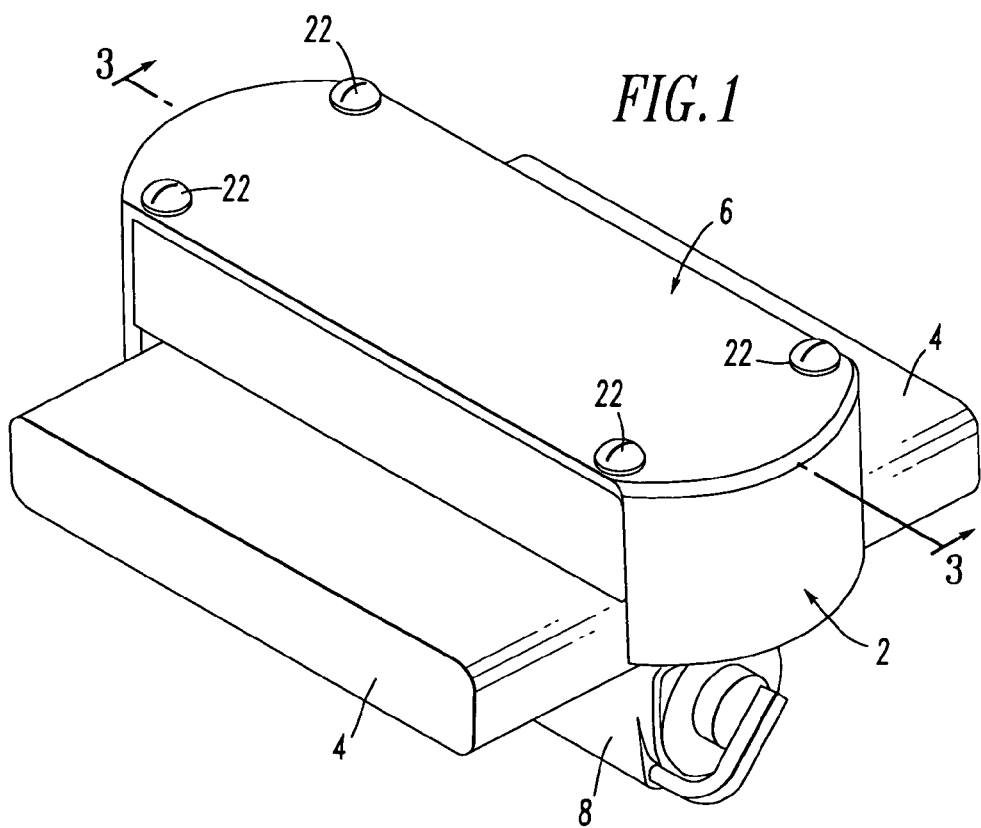
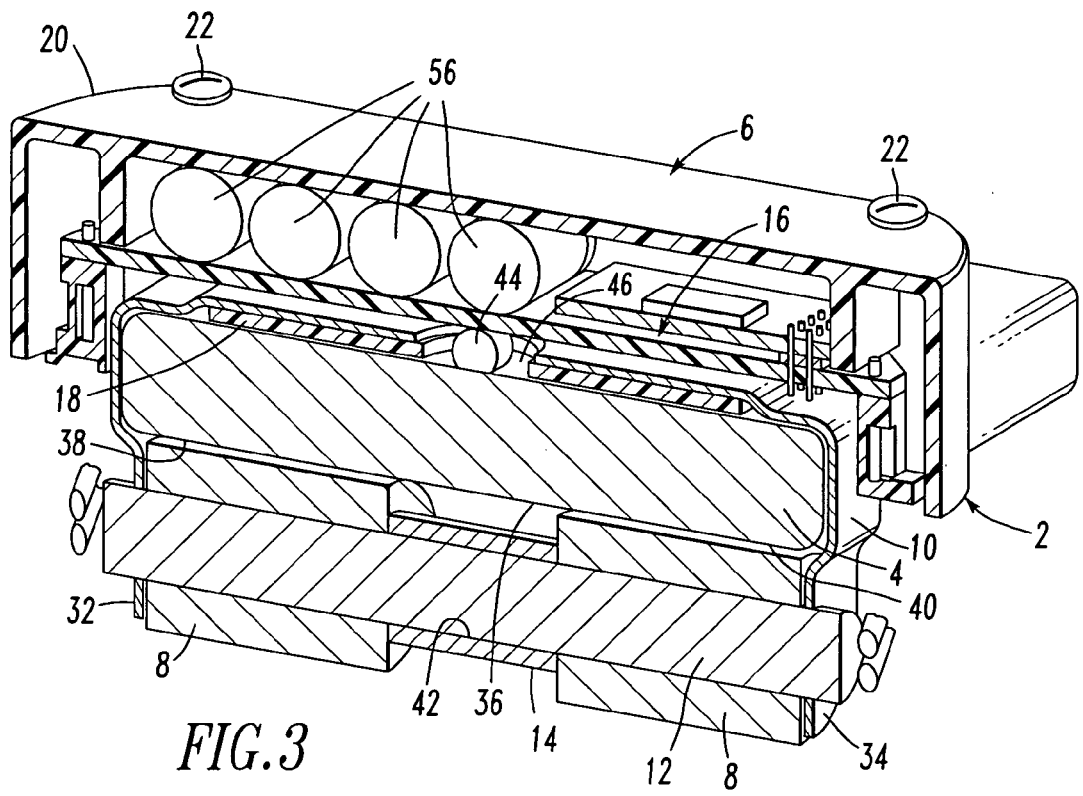

WIRELESS SYSTEM FOR ONE OR MORE ELECTRICAL SWITCHING APPARATUS

This application is a continuation-in-part of application Ser. No. 11/038,899, filed Jan. 19, 2005 now U.S. Pat. No. 7,253,602, and entitled "Self-Powered Power Bus Sensor Employing Wireless Communication," which is a continuation-in-part of application Ser. No. 10/962,682, filed Oct. 12, 2004 now U.S. Pat. No. 7,145,322, and entitled "Self-Powered Power Bus Sensor Employing Wireless Communication".

BACKGROUND OF THE INVENTION

1. Field of the Invention

This invention pertains generally to communication systems and, more particularly, to such systems providing communications to or from one or more electrical switching apparatus, such as circuit breakers.

2. Background Information

An electrical distribution system typically consists of a plurality of protective, metering and control devices mounted within an enclosure, such as a switchgear or motor control center metal cabinet or suitable plastic enclosure. A wired communication mechanism is often provided that allows the various devices to communicate with a display device on the enclosure or to communicate to a remote location, which monitors the condition of the system. The wired communication mechanism within the enclosure typically employs one or more wired field busses.

Electrical distribution devices, such as circuit breakers, are installed within the metal switchgear cabinet. Many of these devices are capable of communicating, for example, on-line data, and alarm/status, cause-of-trip and setpoint information. Typically, the wired field busses are "twisted pair" busses that interconnect the devices to a single node associated with the switchgear cabinet. There are numerous versions of that node including: (1) local nodes with a human machine interface (HMI) (e.g., displays and switches) intended for use on the cabinet; (2) nodes that are "headless" and serve as interfaces or gateways for connecting the devices to one or more remote communication systems; and (3) nodes that serve both the local and remote functions.

For example, an electrical distribution system may include a twisted-pair field bus network and a "headless" node that interfaces plural in-gear field bus communicating devices to an external Ethernet communicating system.

In terms of the health of the one or more electrical switching apparatus of an electrical distribution system, of particular interest are the conditions of the separable contacts and the temperatures of a bus bar or cable termination of an electrical switching apparatus, such as, for example and without limitation, a circuit breaker or contactor. For example, every time a circuit breaker or contactor interrupts a current, a certain amount of contact wear and erosion occurs. As the contact condition degrades, the contact resistance can result in a higher than normal contact temperature, which can compromise the insulation system. A higher than normal apparatus-to-bus bar or cable termination resistance can also result in an over-temperature insulation condition.

It is known to sense contact wear by noting the change in location of the moving contact from a fixed reference when a circuit breaker is in the closed position. As the contacts wear, this travel will increase. For example, U.S. Pat. No. 6,150,625 discloses an erosion gauge tool, which clearly provides an indication of the level of wear of separable contacts housed in a vacuum chamber. Also, U.S. Pat. No. 6,002,560 discloses a flexible, resilient contact wear indicator.

It is also known to directly assess the effect of a relatively high breaker-to-bus bar or cable termination resistance by measuring the bus bar or cable termination temperature. Breaker contact wear can also contribute to the termination temperature rise.

There is room for improvement in communications in electrical distribution systems and within or among one or more electrical switching apparatus.

SUMMARY OF THE INVENTION

These needs and others are met by the present invention, which employs a plurality of sensors structured to sense conditions of electrical switching apparatus and communicate the sensed conditions over corresponding wireless signals, such as, for example, relatively low power, short range, radio frequency communications, to a display or control unit.

In accordance with one aspect of the invention, a system for displaying information from or for controlling electrical switching apparatus comprises: at least one electrical switching apparatus comprising separable contacts and a plurality of conditions; a plurality of sensors structured to sense at least some of the conditions of the at least one electrical switching apparatus and communicate the sensed at least some of the conditions over corresponding wireless signals; and a unit operatively associated with the at least one electrical switching apparatus, the unit structured to receive the corresponding wireless signals and display information corresponding to at least one of the sensed at least some of the conditions or to control the at least one electrical switching apparatus based upon at least one of the sensed at least some of the conditions.

The at least one electrical switching apparatus may be a plurality of circuit interrupters of a switchgear assembly or a motor control center.

The at least one electrical switching apparatus may be a circuit breaker including a bus bar and a circuit breaker-bus bar connection, and the temperature of the circuit breaker may correspond to the circuit breaker-bus bar connection. The bus bar may include a bolted bus bar connection, and the temperature of the circuit breaker may correspond to the bolted bus bar connection.

One of the sensors may be structured to sense contact wear of the separable contacts of the at least one electrical switching apparatus as one of the sensed at least some of the conditions.

The at least one electrical switching apparatus may be a circuit breaker further comprising a trip unit, the sensors may include a contact wear sensor structured to sense contact wear of the separable contacts of the circuit breaker as one of the conditions, and the unit of the system may be part of the trip unit of the circuit breaker.

The unit may be external to the at least one electrical switching apparatus and include a display, with the displayed information being output on the display.

The at least one electrical switching apparatus may comprise at least one circuit breaker, the sensors may be structured to sense the conditions of the at least one circuit breaker, and the unit may be separated from the at least one circuit breaker.

The unit may be internal to one electrical switching apparatus and may include a communication link structured to communicate the displayed information to a remote location.

The sensors may be a plurality of slave devices, the unit may form a master device, and each of the slave devices may communicate directly with the master device.

The sensors and the unit may form a plurality of mesh type devices, at least one of the sensors may communicate directly with another one of the sensors, and at least one of the sensors may communicate directly with the master device.

The sensors may include a first sensor and a second sensor. The sensed at least one of the conditions may include a first sensed condition and a second sensed condition. The first sensor may be structured to sense a temperature of the at least one electrical switching apparatus as the first sensed condition, and the second sensor may be structured to sense contact wear of the separable contacts of the at least one electrical switching apparatus as the second sensed condition.

BRIEF DESCRIPTION OF THE DRAWINGS

A full understanding of the invention can be gained from the following description of the preferred embodiments when read in conjunction with the accompanying drawings in which:

FIG. 1 is an isometric view of a self-powered wireless power bus temperature sensor.

FIG. 3 is a cross sectional view along lines 3-3 of FIG. 1.

DESCRIPTION OF THE PREFERRED EMBODIMENTS

Figure 2:
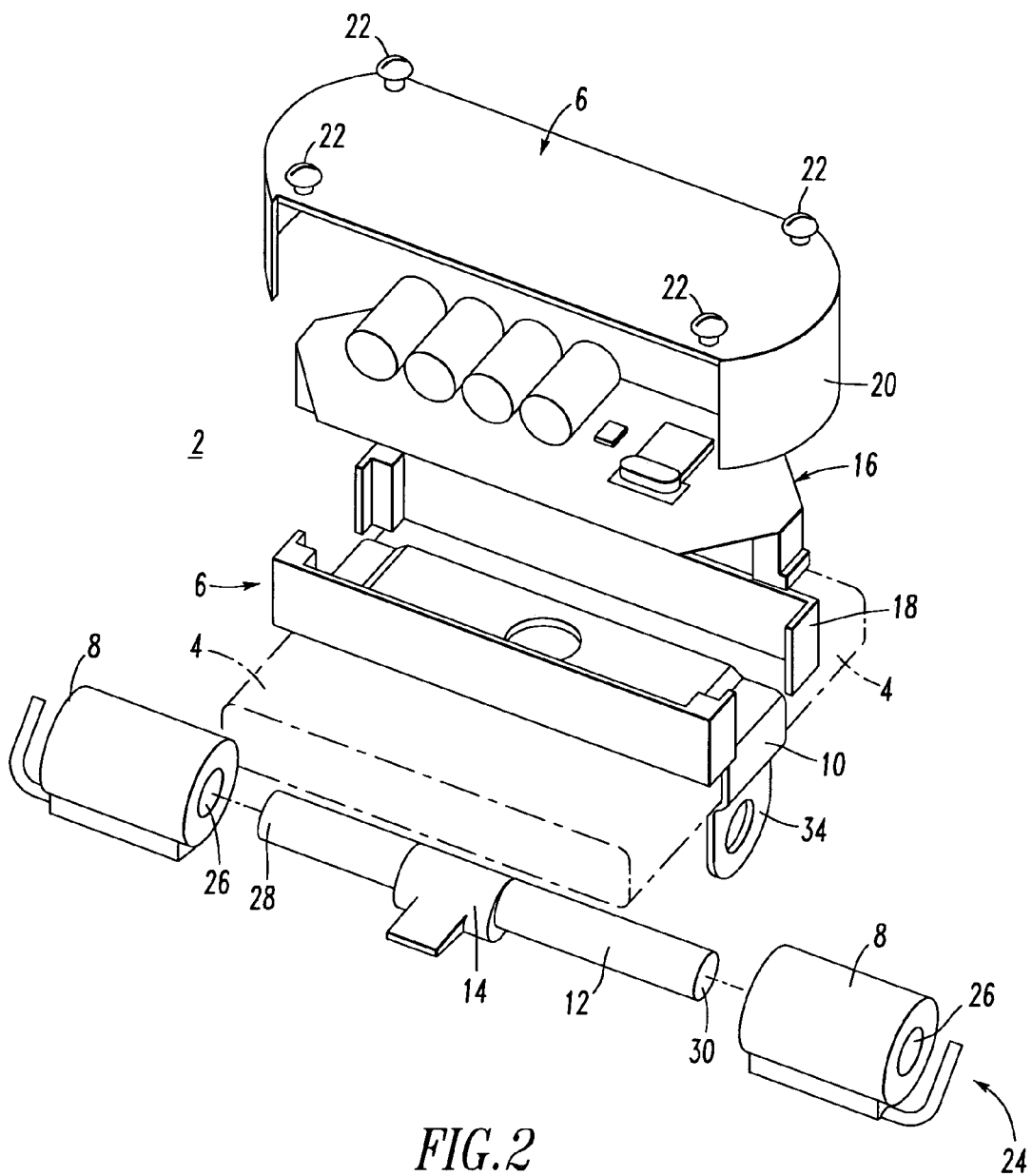
FIG. 2 is an exploded isometric view of the temperature sensor of FIG. 1.

As employed herein the term "antenna" shall expressly include, but not be limited by, any structure adapted to radiate and/or to receive electromagnetic waves, such as, for example, radio frequency signals.

As employed herein the term "switchgear device" shall expressly include, but not be limited by, a circuit interrupter, such as a circuit breaker (e.g., without limitation, low-voltage or medium-voltage or high-voltage); a contactor; a motor controller/starter; and/or any suitable device which carries or transfers current from one place to another.

As employed herein the term "power bus" shall expressly include, but not be limited by, a power conductor or cable; a power bus bar; and/or a power bus structure for a circuit interrupter.

As employed herein, the term "wireless" shall expressly include, but not be limited by, radio frequency (RF), infrared, IrDA, low-rate wireless personal area networks (LR-WPANs), other types of wireless sensor networks, wireless area networks, IEEE 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular. Furthermore, the term "wireless communication" means communication without a wire, without an electrical conductor and without an optical fiber or waveguide.

As employed herein, the term "portable wireless communicating device" shall expressly include, but not be limited by, any portable communicating device having a wireless communication port (e.g., a portable wireless device; a portable wireless display; a portable wireless operator interface; a portable personal computer (PC); a Personal Digital Assistant (PDA); a data phone).

As employed herein, the term "wireless signal" means a radio frequency signal, an infrared signal or another suitable visible or invisible light signal that is transmitted and/or received without a wire, without an electrical conductor and without an optical fiber or waveguide.

As employed herein, the term "low-rate wireless signal" means IrDA, Bluetooth, and other suitable radio frequency, infrared, or other light, wireless communication protocols or wireless signals.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The present invention is described in association with a switchgear system, although the invention is applicable to a wide range of electrical distribution systems (e.g., without limitation, motor control centers (MCCs) including, for example, motor starting contactors; packaged controls (e.g., machine/equipment mounted); panelboards; load centers). The present invention is also described in association with a temperature sensor and/or a current sensor for a power bus bar, although the invention is applicable to a wide range of sensors for power busses and electrical switching apparatus.

Figure 5:
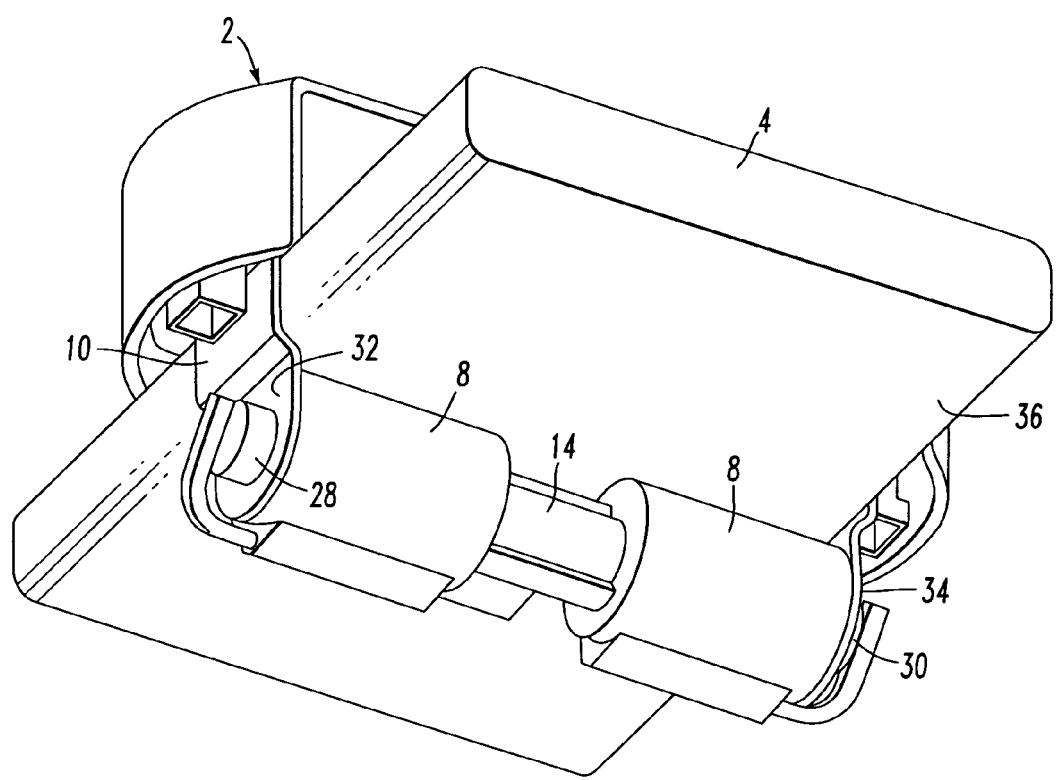
FIG. 5 is an isometric view of the temperature sensor and the two bus coils of FIG. 2.

Referring to FIG. 1, a self-powered wireless power bus temperature sensor device 2 is disposed about a power bus bar 4. The sensor device 2 includes a housing, such as an insulated enclosure 6, and two power coils 8 (only one coil 8 is shown in FIG. 1; two coils 8 are shown in FIGS. 2, 3 and 5). Alternatively, only one coil (not shown) of suitable size need be employed.

Also referring to FIG. 2, the sensor device 2 further includes a magnetic flux concentrator member 10 (e.g., made of cold rolled steel), a ferrite core 12 (e.g., made of a suitable ferrous material), an assembly clip/spacer 14, an electronics board assembly 16, an insulated case 18 (e.g., made of nylon), an insulated cover 20 (e.g., made of nylon), and four insulated screws 22 (e.g., made of nylon).

Alternatively, one or both of the magnetic flux concentrator member 10 and the ferrite core 12 need not be employed. The ferrite core 12 (e.g., magnetic, but suitably low conductivity in order to not heat up as much due to eddy currents) produces relatively lower power loss (e.g., heat) due to AC flux. Alternatively, a suitable laminated structure (e.g., as employed in transformers) may be employed.

As will be explained, below, in connection with FIGS. 3, 5 and 6, a power supply 24 is adapted to couple the housing 6 to a current carrying power bus, such as the power bus bar 4. The power supply 24 includes the two power coils 8 each of which has an opening 26, the ferrite core 12 having two ends 28,30, and the magnetic flux concentrator member 10 having two ends 32 (as shown in FIGS. 3 and 5) and 34. The ferrite core 12 passes through the openings 26 of the power coils 8. The ends 32,34 of the magnetic flux concentrator member 10 engage the respective ends 28,30 of the ferrite core 12. The ferrite core 12 and the magnetic flux concentrator member 10 encircle and capture the power bus bar 4, with the member 10 coupling the case 18 thereto. The common ferrite core 12 and the magnetic flux concentrator member 10 further combine to act as a flux concentrator and, also, hold the sensor device 2 to the power bus bar 4 (as shown in FIGS. 3 and 5). As will be discussed below in connection with FIG. 6, the sensor device 2 uses the two flux sensing power coils 8 and the common inserted ferrite core 12 for improved magnetic flux coupling (e.g., as seen by Faraday's law, V=IR+dλ/dt, wherein λ is flux linkage) to convert the magnetic flux from the power bus bar 4 to a usable voltage source to provide suitable input power for the power supply 24. As a result, the sensor device 2 is self-powered.

Referring to FIG. 3, the power bus bar 4 includes a generally planar surface 36. The common ferrite core 12 and the magnetic flux concentrator member 10 cooperate to hold the power coils 8 against or proximate to the generally planar surface 36. That surface 36 has a first end 38 and an opposite second end 40. The spacer 14 has an opening 42 through which the ferrite core 12 passes. The spacer 14 is disposed between the power coils 8, each of which is adapted to be proximate one of the ends 38,40 of the surface 36.

The sensor device 2 also includes a suitable temperature sensor 44 (e.g., an LM35 precision temperature sensor marketed by National Semiconductor of Santa Clara, Calif.) that is suitably thermally coupled with another generally planar surface 46 of the power bus bar 4. The output of the sensor 44 is electrically input by the electronics board assembly 16, as will be described, below, in connection with FIG. 6.

The sensor device 2 is, thus, designed to fasten itself around the power bus bar 4. This provides two benefits. First, the mechanical position of the temperature sensor 44 on the power bus bar 4 is provided. Second, a relatively better path for magnetic flux to link the power coils 8 as employed for self-power is provided.

EXAMPLE 1

The design of the sensor device 2 fits a power bus bar 4 with suitable cross sectional dimensions (e.g., without limitation, about 3.0 inches×about 0.5 inches), although a wide range of other power bus dimensions may be employed by employing suitable sizes of the flux concentrator member 10, the ferrite core 12 and the spacer 14.

EXAMPLE 2

A wide range of temperature sensors may be employed. For example, a silicon diode (not shown) may be suitably thermally coupled with or suitably disposed proximate to the surface 46 of the power bus bar 4 for heating thereby. For example, the forward voltage drop across the diode decreases linearly with an increase in the temperature of the power bus bar 4. The forward voltage of the diode as energized by the power supply 24 is electrically input by an electronics board assembly, such as 16.

Although a silicon diode is disclosed, other forward biased PN junctions could be used, such as, for example, gallium arsenide. Alternatively, any suitable active or passive temperature measuring or sensing device (e.g., RTDs (resistive temperature detectors), various metals (e.g., copper, nickel, platinum) having resistance, voltage or current characteristics versus temperature) may be employed.

Figure 4:
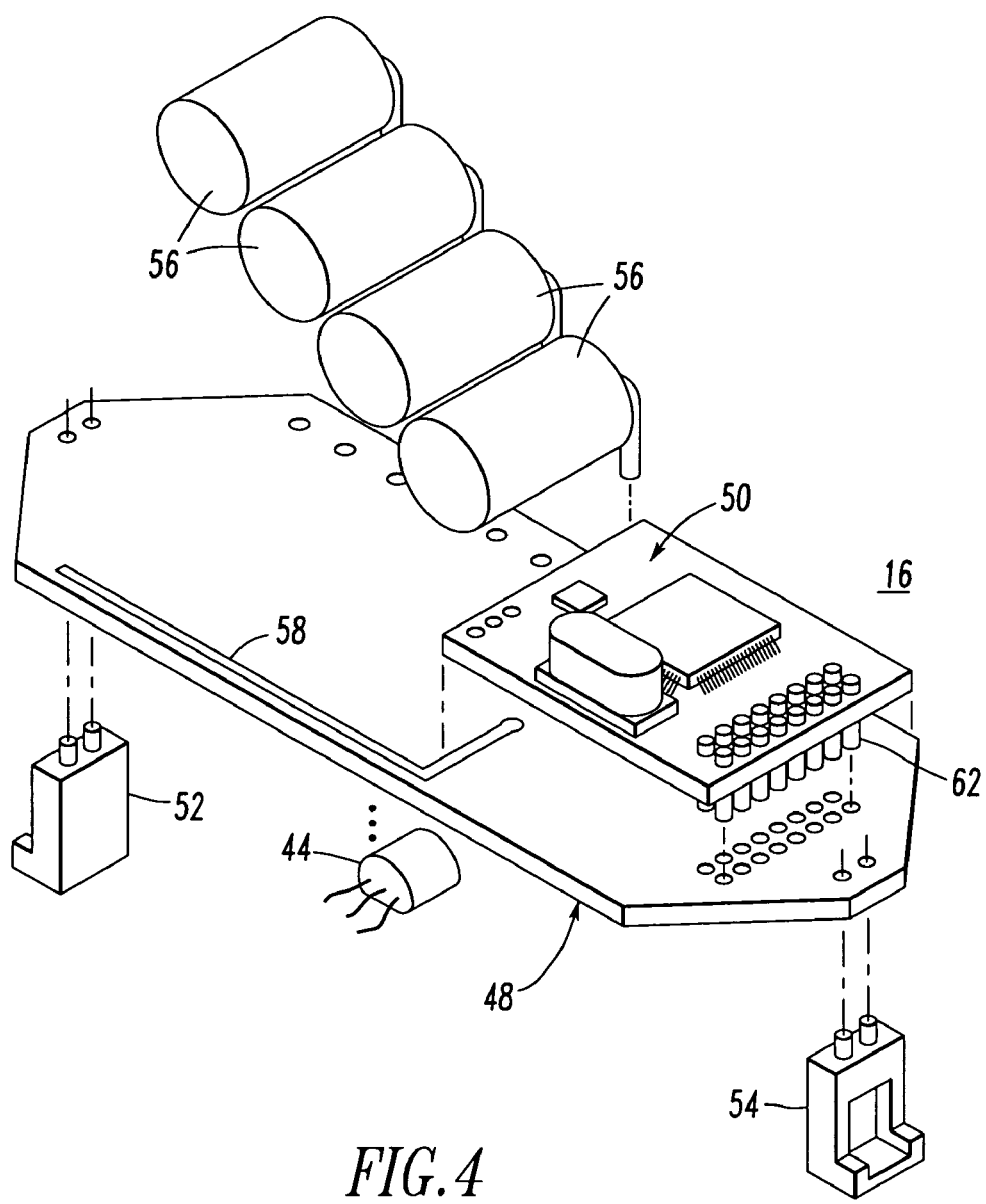
FIG. 4 is an exploded isometric view of the electronics board assembly of FIG. 2.

Referring to FIG. 4, the electronics board assembly 16 is shown. The assembly 16 includes a temperature sense printed circuit board 48, the temperature sensor 44, a radio transceiver printed circuit daughter board 50, two 2-pin board connectors 52,54, and four capacitors 56. Alternatively, any suitable capacitive energy storage configuration (e.g., one or more capacitors or supercaps) may be employed. The radio transceiver daughter board 50 provides wireless communication through a suitable antenna, which is a printed conductor, such as conductive trace 58, on the temperature sense printed circuit board 48.

Figure 6:
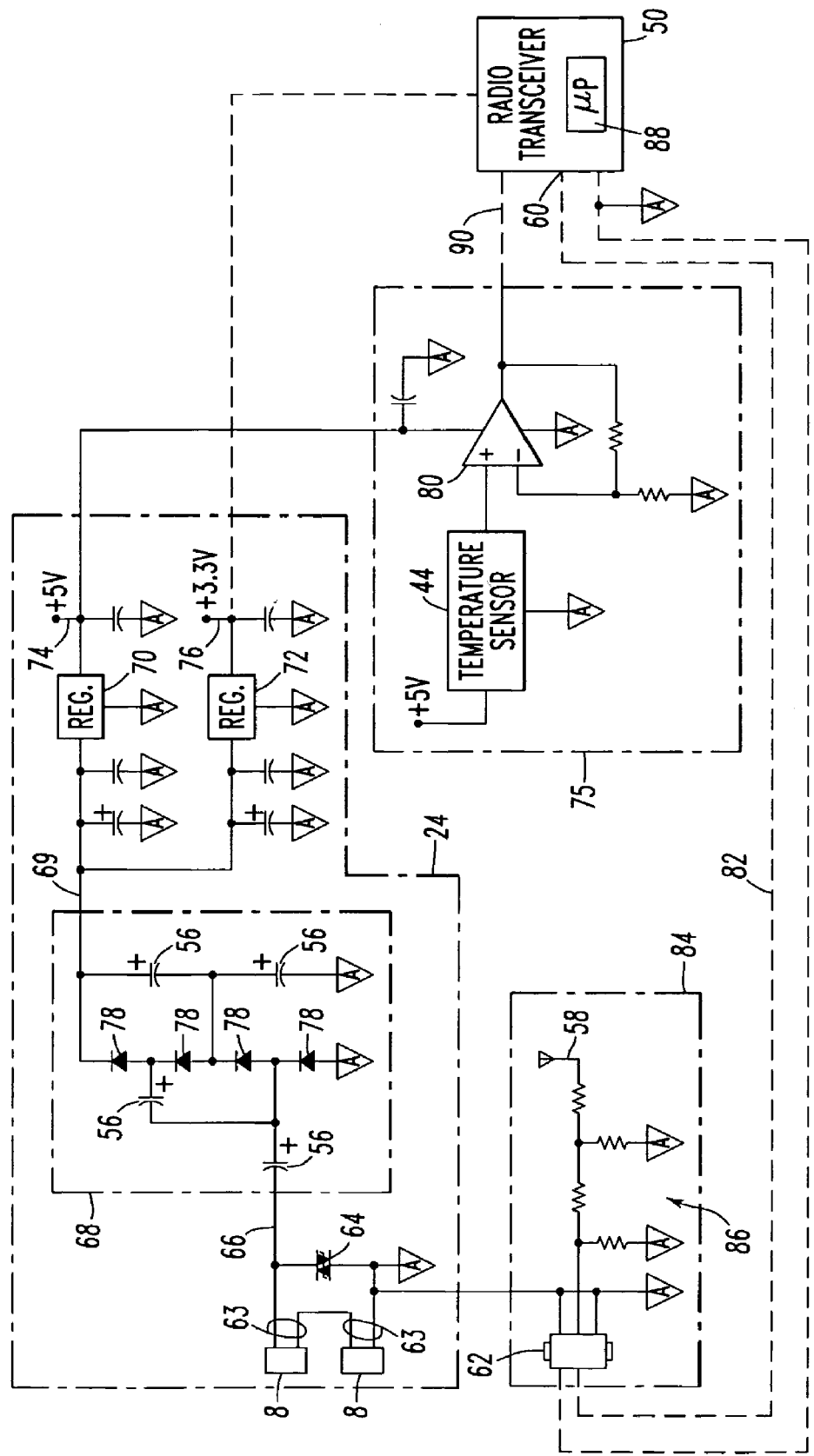
FIG. 6 is a block diagram in schematic form of the electronics board of FIG. 2.

The daughter board 50 includes an antenna output 60 (FIG. 6). The printed circuit board 48 includes a connector 62 (FIGS. 4 and 6) electrically connecting the conductive trace 58 to the antenna output 60.

EXAMPLE 3

The antenna 58 may be a printed circuit board inverted-L antenna with Gamma match. For example, the length of the antenna 58 may be designed for a quarter wave 915 MHz signal.

EXAMPLE 4

As an alternative to Example 3, any suitable antenna may be employed. A wide range of antenna types, communication distances and other frequency designs (e.g., 2.4 GHz) may be employed.

EXAMPLE 5

The radio transceiver daughter board 50 may be, for example, any suitable wireless transmitter or transceiver.

EXAMPLE 6

Although two printed circuit boards 48,50 are shown, a single printed circuit board or other suitable circuit structure may be employed.

EXAMPLE 7

Another example of the radio transceiver daughter board 50 is a Zensys A-Wave FSK radio marketed by Zensys Inc. of Upper Saddle River, N.J.

EXAMPLE 8

Alternatively, any suitable radio circuit (e.g., without limitation, a Zigbee compatible board; a Zigbee compliant transceiver (e.g., http://www.zigbee.org); an IEEE 802.15.4 transmitter or transceiver; a radio board, a radio processor) may be employed.

EXAMPLE 9

Application programs are added to the Zensys radio board of Example 7 to provide application specific communication of temperature information from the temperature sensor 44. For example, features such as sleep mode, how often data is sent, transmit data format and the receipt of acknowledgements or requests for data may be suitably programmed.

FIG. 5 shows the temperature sensor device 2 and the two power coils 8, which are positioned on the lower (with respect to FIG. 5) side of the power bus bar 4. This allows running the flux concentrator member 10 around the power bus bar 4 for producing suitable self-power at appropriate bus current levels.

EXAMPLE 10

As a non-limiting example, at bus current levels of 400 A to 600 A, the power supply 24 of FIG. 6 may regulate +5 VDC and/or +3.3 VDC and provide 30 mA at those bus currents, although relatively lower (e.g., 50 A) or relatively higher (e.g., 1200 A) bus currents may be employed.

Continuing to refer to FIG. 6, the circuitry of the temperature sense printed circuit board 48 of FIG. 4 is shown. Each of the coils 8 includes a winding 63 which is electrically connected in series with the winding of the other coil. The series electrically connected coil windings 63 output a voltage. A suitable transient voltage suppressor 64 is electrically connected across the series combination of the power coils 8 in order to limit the voltage 66 by shunting relatively high current spikes for short durations and relatively low current spikes for relatively longer durations. The coil (alternating current (AC)) voltage 66 is input by a voltage quadrupler circuit 68, which, in turn, outputs a suitable direct current (DC) voltage 69 to two voltage regulators 70 and 72 providing a +5 VDC voltage 74 for a temperature circuit 75 and a +3.3 VDC voltage 76 for the radio transceiver daughter board 50 of FIG. 4. The example circuit 68 includes the four capacitors 56 and four diodes 78 that provide energy storage and rectification, although a wide range of suitable protection and multiplication circuits may be employed.

The temperature circuit 75 includes the temperature sensor 44 and a buffer amplifier 80. The radio transceiver daughter board 50 is adapted to transmit (and/or receive) a wireless signal 82 through a suitable antenna circuit 84. The antenna circuit 84 includes the connector 62, the conductive trace 58 and a suitable matching circuit 86.

The daughter board 50 includes a suitable processor, such as a microprocessor (μP) 88, which inputs the sensed temperature characteristic 90 from the temperature circuit 75 and outputs the corresponding wireless signal 82.

As is discussed below in connection with FIGS. 7-10, power savings may be provided by employing a relatively efficient wireless communication board and/or by employing a processor including appropriate sleep (e.g., low-power) and wake up modes.

EXAMPLE 11

As a non-limiting example, the temperature circuit 75 draws about 5 mA from the +5 VDC voltage 74 and the radio transceiver daughter board 50 draws 40 mA during wireless transmission and 50 mA during reception in which peak power may be supplied by capacitors, such as 56, in the power supply 24 during these relatively short durations of time. Otherwise, the radio transceiver is preferably turned off.

EXAMPLE 12

Figure 7:
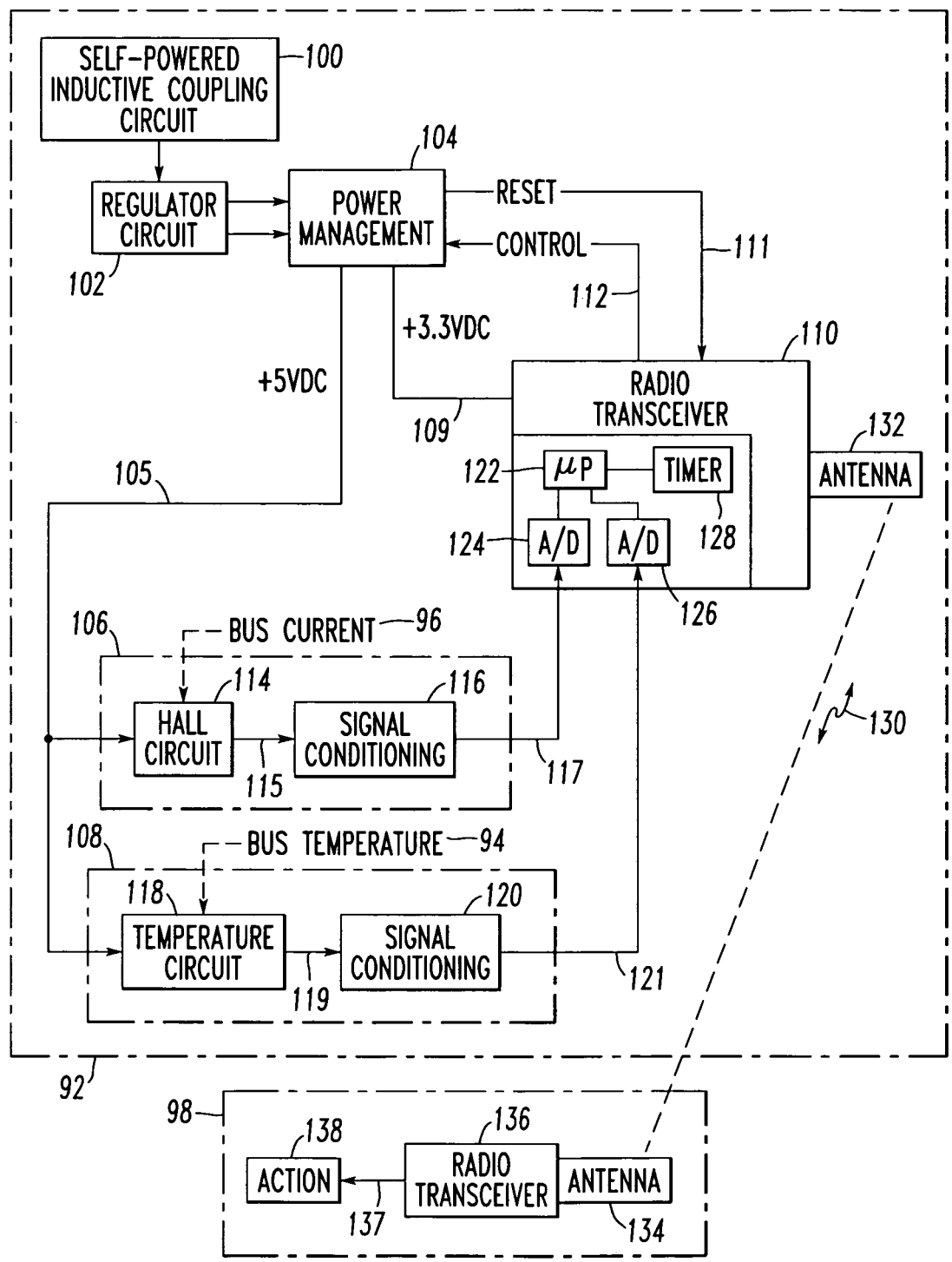
FIG. 7 is a block diagram of another wireless power bus sensor for measuring bus temperature and bus current.

FIG. 7 shows another stand-alone wireless power bus sensor 92 for measuring a characteristic of a power bus, such as bus temperature 94 and/or bus current flow 96. The self-powered sensor 92 is independently coupled to a power bus, such as the power bus bar 4 of FIG. 1, and wirelessly communicates the sensed bus temperature 94 and/or the sensed bus current flow 96 to a remote device 98 at a suitable time interval (e.g., without limitation, every few seconds; every few minutes).

The sensor 92 includes a suitable self-powered inductive coupling circuit 100 and a regulator circuit 102 that may function in a similar manner as the power supply 24 of FIGS. 1 and 6. In addition, a power management circuit 104 may be employed to provide the additional functions of: (1) managing a +5 VDC voltage 105 to a current sensing circuit 106 and a temperature sensing circuit 108; (2) managing a +3.3 VDC voltage 109 to a radio transceiver circuit 110; (3) providing a power on reset signal 111 to the radio transceiver circuit 110 whenever the voltages from the regulator circuit 102 are initially established; and/or (4) circuit deactivation to minimize energy consumption.

For example, if a control signal 112 from the radio transceiver circuit 110 is set to one state (e.g., true), then the power management circuit 104 outputs the normal voltages 105 and 109 to the respective circuits 106, 108 and 110. Otherwise, the voltage 105 is disabled and the voltage 109 is reduced to a suitable sleep-mode voltage (e.g., without limitation, about 1.0 VDC). In this manner, energy conservation is continuously occurring in order to maintain the charge on the local power supply (e.g., capacitors (not shown)).

Preferably, as is discussed below in connection with FIGS. 8-10, suitable power management routines are employed to help save energy consumption by putting a microprocessor 122 into a sleep (e.g., low-power) mode and waking up when data is to be sent. As a result, this may allow the sensor 92 to self-power at relatively lower bus currents.

EXAMPLE 13

The bus current flow 96 is measured by a suitable current sensor 114 of the current sensing circuit 106. For example, the current in the power bus is measured with one or two appropriately placed Hall sensors (not shown) to measure flux density near the power bus. A flux density signal 115 is suitably conditioned by a signal conditioning circuit 116 and is input at 117 by the radio transceiver 110.

EXAMPLE 14

The bus temperature 94 is measured by a suitable temperature circuit 118 of the temperature sensing circuit 108. The circuit 118 and its signal conditioning circuit 120 may be the same as or similar to the sensors as discussed above in connection with Example 2 and FIG. 6. A temperature signal 119 is suitably conditioned by the signal conditioning circuit 120 and is input at 121 by the radio transceiver 110.

Continuing to refer to FIG. 7, the radio transceiver 110 includes a suitable processor, such as the microprocessor (µP) 122, two analog-to-digital (A/D) converters 124 and 126, which include the respective inputs 117 and 121, and a timer 128, which is adapted to interrupt the processor 122 to wake up from its low-power mode. After initialization (e.g., startup), the microprocessor 122 enters a low power mode. The current and temperature signals at the inputs 117,121 are converted by the A/D converters 124,126, respectively, to corresponding digital signals and are transmitted by the radio transceiver 110 as a wireless signal, such as a low-rate wireless signal 130, from the antenna 132.

EXAMPLE 15

For example, the signal 130 is sent every few minutes in order to conserve energy from the regulator circuit 102.

EXAMPLE 16

The remote device 98 receives the wireless signal 130 through antenna 134 to a corresponding radio transceiver 136, which, in turn, outputs a signal 137 to take a corresponding action 138.

EXAMPLE 17

The action 138 may be a display action adapted to display the sensed characteristic of the power bus.

EXAMPLE 18

The action 138 may be a flag (e.g., alarm) action adapted to alarm the sensed characteristic of the power bus.

EXAMPLE 19

The action 138 may be a wellness action adapted to determine the health of the power bus based upon the sensed characteristic thereof. As a non-limiting example, a suitable diagnostic algorithm, a suitable data mining algorithm or a look-up table (not shown) may be employed to make a calculation on the health of the power bus bar 4 or corresponding switchgear system (not shown) based on recorded historical (e.g., trend) data or known parameters of operation.

EXAMPLE 20

The action 138 may be a trip action adapted to trip a switchgear device (not shown) based upon the sensed characteristic of the power bus.

Figure 8:
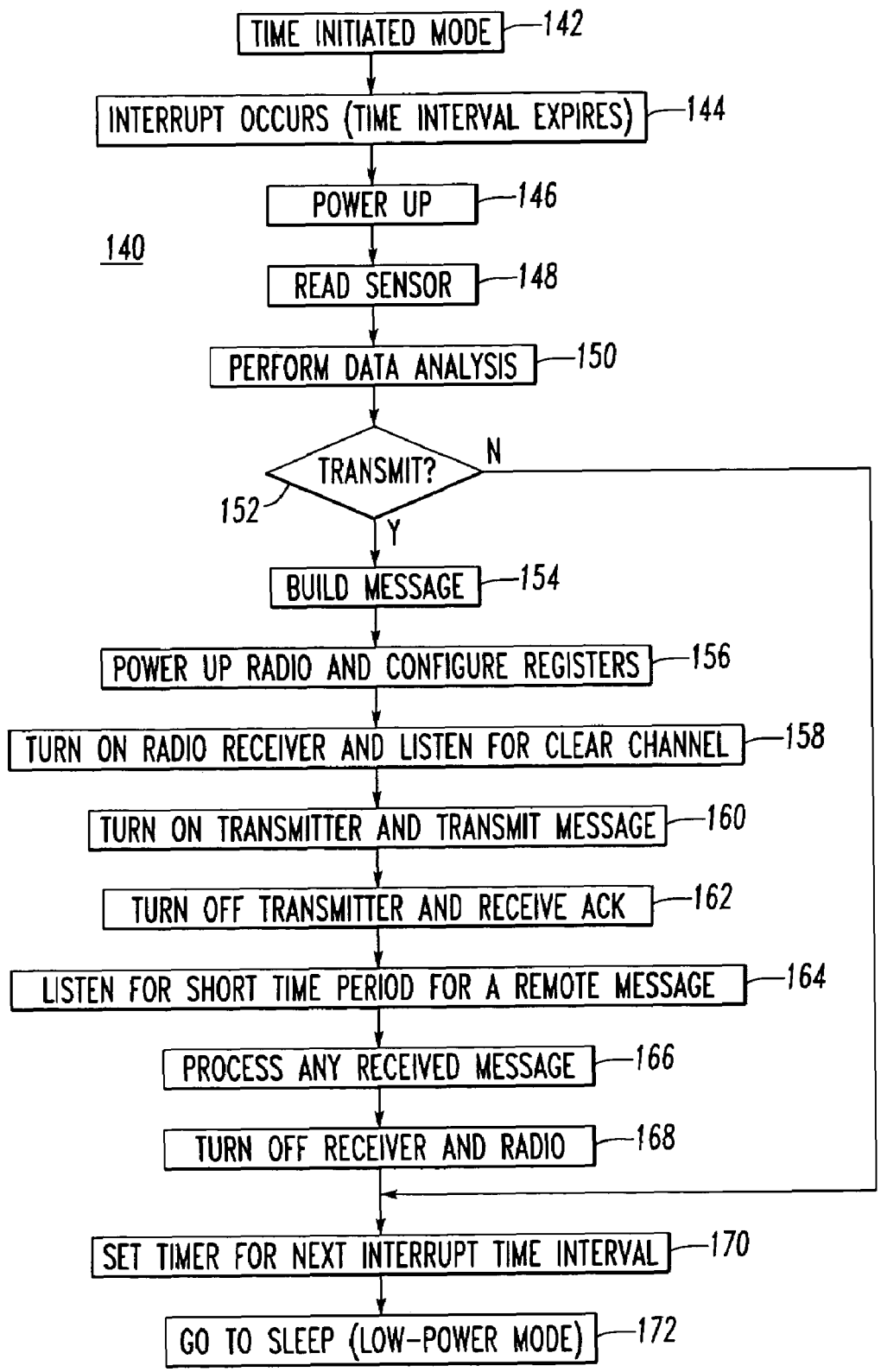
FIGS. 8-10 are flowcharts of software executed by the processor of FIG. 7.

FIG. 8 shows a software routine 140 executed by the microprocessor 122 of FIG. 7, although the same or similar routine may be employed by the microprocessor 88 of FIG. 6. The microprocessor 122 includes a low-power mode and the routine 140 is adapted to wake up from that low-power mode, input the sensed characteristic(s) of the power bus (e.g., the power bus bar 4 of FIG. 1), to prepare a message to output as the corresponding wireless signal 130 of FIG. 7, and, then, to sleep in the low-power mode.

The time initiated mode 142 begins, at 144, when an interrupt to the microprocessor 122 of FIG. 7 occurs after the time interval of the timer 128 expires. In response, at 146, the microprocessor 122 wakes up from the low-power mode. Next, at 148, the sensed characteristic(s) of the power bus is (are) read (e.g., from the A/D converters 124,126). Then, at 150, suitable data analysis may be performed on the sensed bus characteristic(s). For example, the raw sensor data may be converted to temperature (e.g., ° C.; ° F.) values or current (e.g., A) values and/or the state of health of the power bus may be performed based on a suitable diagnostic algorithm (not shown) and historic data collection and/or the temperature or current values may be compared to preset limit values (not shown). Next, at 152, a decision is made whether to transmit. For example, this decision could always be yes (e.g., the duty cycle for the low-power sleep mode versus transmitting a message is low enough in order that energy consumption is less than the total energy harvested between interrupt intervals), could be based upon the magnitude of change or the value of the bus characteristic(s), and/or could be based upon whether sufficient power supply voltage is present. If not, then execution resumes at 170. Otherwise, execution resumes at 154, which builds a suitable message frame (not shown) for transmission. Then, at 156, the microprocessor 122 powers up the radio (not shown) of the radio transceiver 110 and configures the registers (not shown) thereof. Next, at 158, the radio receiver (not shown) is turned on and a suitable clear channel is awaited. Then, at 160, the radio transmitter (not shown) is turned on and the message frame is transmitted as the wireless signal 130. Next, at 162, the radio transmitter is turned off and an acknowledge message (not shown) is received from the recipient of that wireless signal 130. Next, at 164, the radio receiver is checked for any remote message (not shown), which, if received, is processed at 166. Then, at 168, the radio receiver and the radio are turned off. Next, at 170, the timer 128 is reset for the next interrupt time interval. Finally, at 172, the microprocessor 122 powers down and enters the low-power sleep mode.

Figure 9:
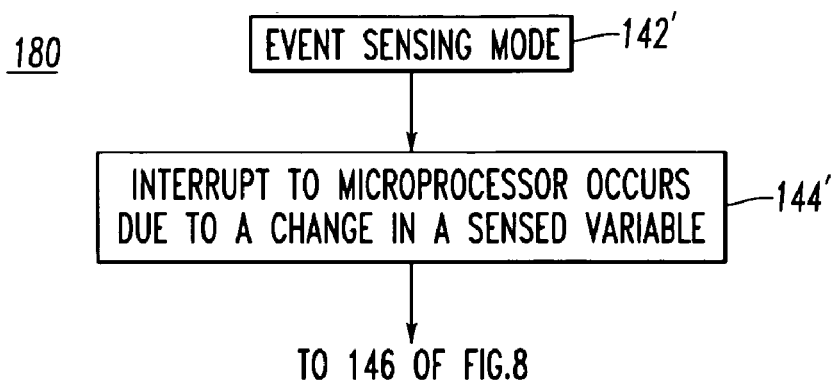

FIG. 9 shows a software routine 180 executed by the microprocessor 122 of FIG. 7, although the same or similar routine may be employed by the microprocessor 88 of FIG. 6. The microprocessor 122 includes an event sensing mode 142' that initiates the interrupt of step 144 of FIG. 8 instead of the timer 128, which need not be employed. At 144', the interrupt to microprocessor 122 occurs as a result of a suitably significant change (Δ) in a sensed variable (e.g., Δ temperature from the temperature sensing circuit 108; Δ current from the current sensing circuit 106; Δ sensed variable from any suitable bus characteristic sensor; Δ power supply voltage from the regulator circuit 102). Thus, a significant change in one or more of the sensed bus characteristic(s) or a significant increase of the power supply voltage(s) may trigger the transmission of the wireless signal 130. For example, these changes may be determined by one or more of the circuits 104,116,120 and may be input by the microprocessor 122 on one or more interrupt lines (not shown). Regardless, this causes the microprocessor 122 to wake up and power up as was discussed above in connection with step 146 of FIG. 8. Execution is otherwise similar to even steps 146-172 of FIG. 8 except that steps 152 and 170 are not employed.

Preferably, one of the routines 140 of FIGS. 8 and 180 of FIG. 9 is employed to provide relatively low energy consumption from the regulator circuit 102 of FIG. 7.

Figure 10:
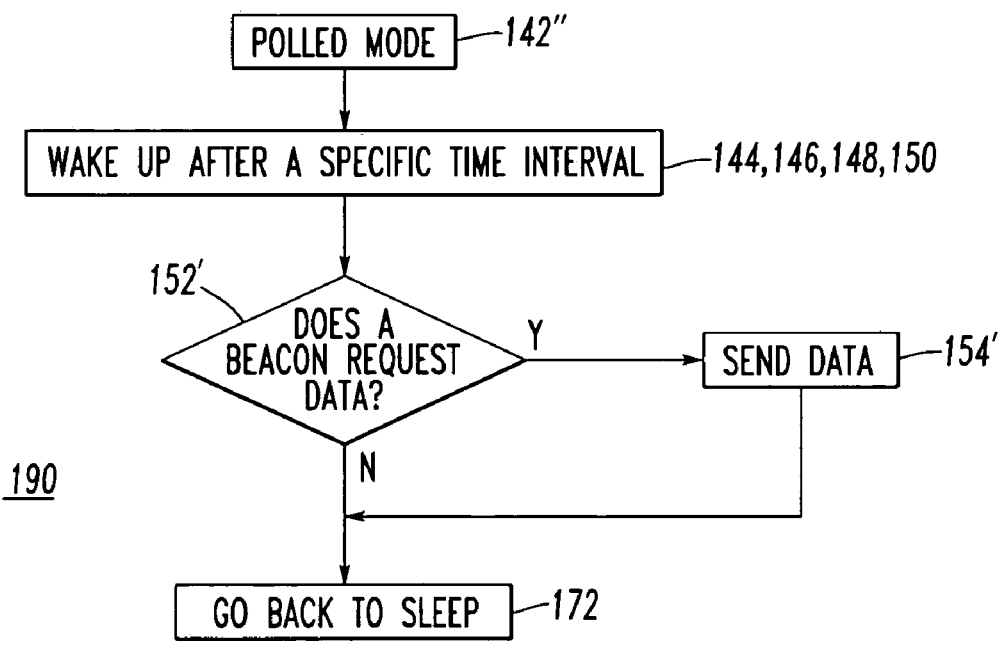

FIG. 10 shows a software routine 190 executed by the microprocessor 122 of FIG. 7, although the same or similar routine may be employed by the microprocessor 88 of FIG. 6. The microprocessor 122 includes a polled mode 142" that includes even steps 144,146,148,150 of FIG. 8 that wake up after the predetermined time interval and read the sensed bus characteristic(s). However, no wireless signal is transmitted unless it is requested by a remote device (e.g., 98 of FIG. 7). Next, step 152' determines whether a received message, such as a beacon message (e.g., employed to trigger a response from another wireless device) requests data. For example, step 152' may include even steps 156,158,164,166,168 of FIG. 8 to receive the message and determine if it requests the transmission of the wireless signal 130. If so, at 154', which employs even steps 154,156,158,160,162 of FIG. 7, the wireless signal 130 is transmitted. Here, the routine 190 causes the microprocessor 122 to wake up after a specific time interval and to listen for a beacon requesting data before sending the wireless signal 130. Otherwise, if there was no request at 152', or after 154', the routine 190 goes back to sleep and checks for another beacon at the end of the next time interval.

EXAMPLE 21

Examples 7-9, above, cover relatively short range RF "meshed networking" (e.g., without limitation, Zigbee compatible; Zigbee compliant; IEEE 802.15.4; ZensysT; Z-WaveT; Zensys) technology, while other applications may employ an automobile-style remote keyless entry (RKE) frequency shift keying (FSK) RF master/slave technology. The difference between these technologies is that nodes using meshing technology may have relatively longer periods (e.g., relatively higher duty cycle) of relatively "high" energy consumption during which the processor and radio are on. In contrast, the RKE FSK RF technology employs a relatively short, single FSK RF burst signal from a slave node, which assumes that a master node is always awake and ready to receive the FSK RF burst signal. As such, a different power supply, such as 24' of FIGS. 11 and 12, may be employed.

Figure 11:
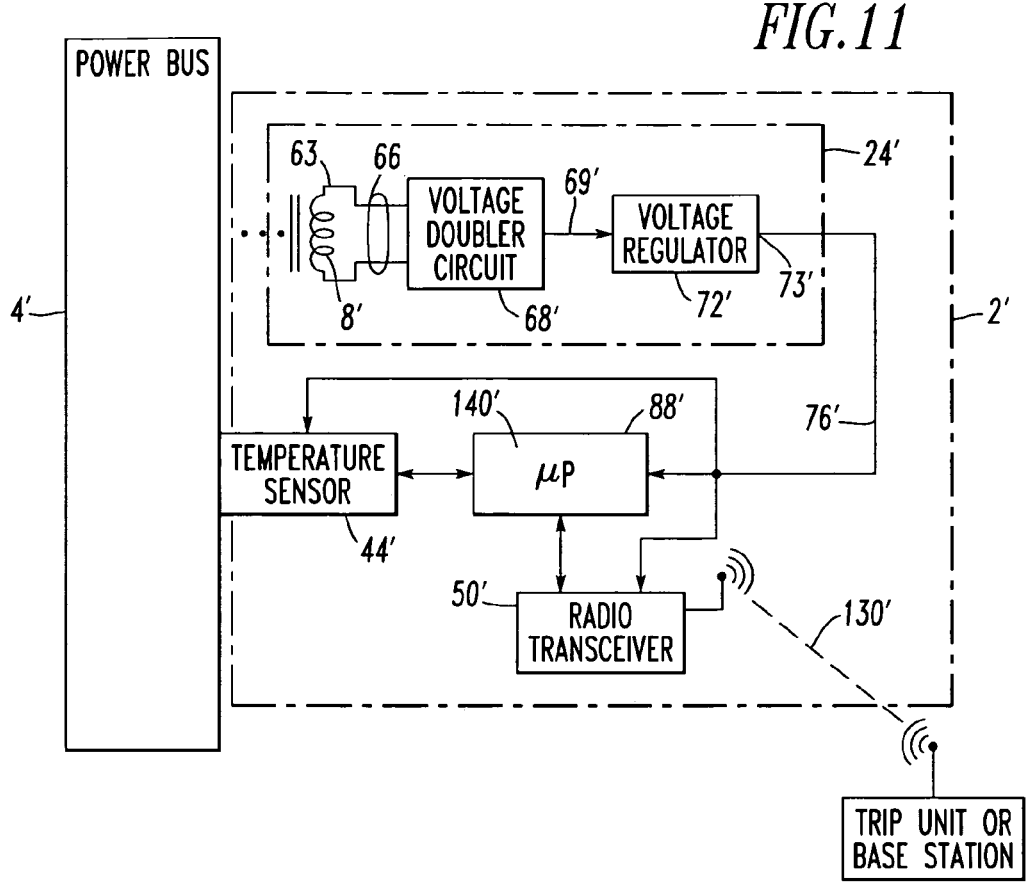
FIG. 11 is a block diagram of another wireless power bus sensor for measuring bus temperature.

FIG. 11 shows another wireless power bus sensor 2' for measuring bus temperature. A processor 88' includes a low-power mode and a routine 140' adapted to wake up from the low-power mode, to input the sensed temperature characteristic of power bus 4' from one or more sensors, such as temperature sensor 44', to output a corresponding signal to the radio transceiver 50' to transmit as a wireless signal 130', and to sleep in the low-power mode. The power supply 24' is adapted to power the sensor(s) 44', the radio transceiver 50' and the processor 88' from flux arising from current flowing in the power bus 4'. The power supply 24' includes one or more voltages, such as 76'. The processor 88' is adapted to perform a power on initialization at 204 (FIG. 13) and execute code in response to a predetermined value (e.g., at least about 2.8 VDC) of the voltage(s) 76'.

Figure 12:
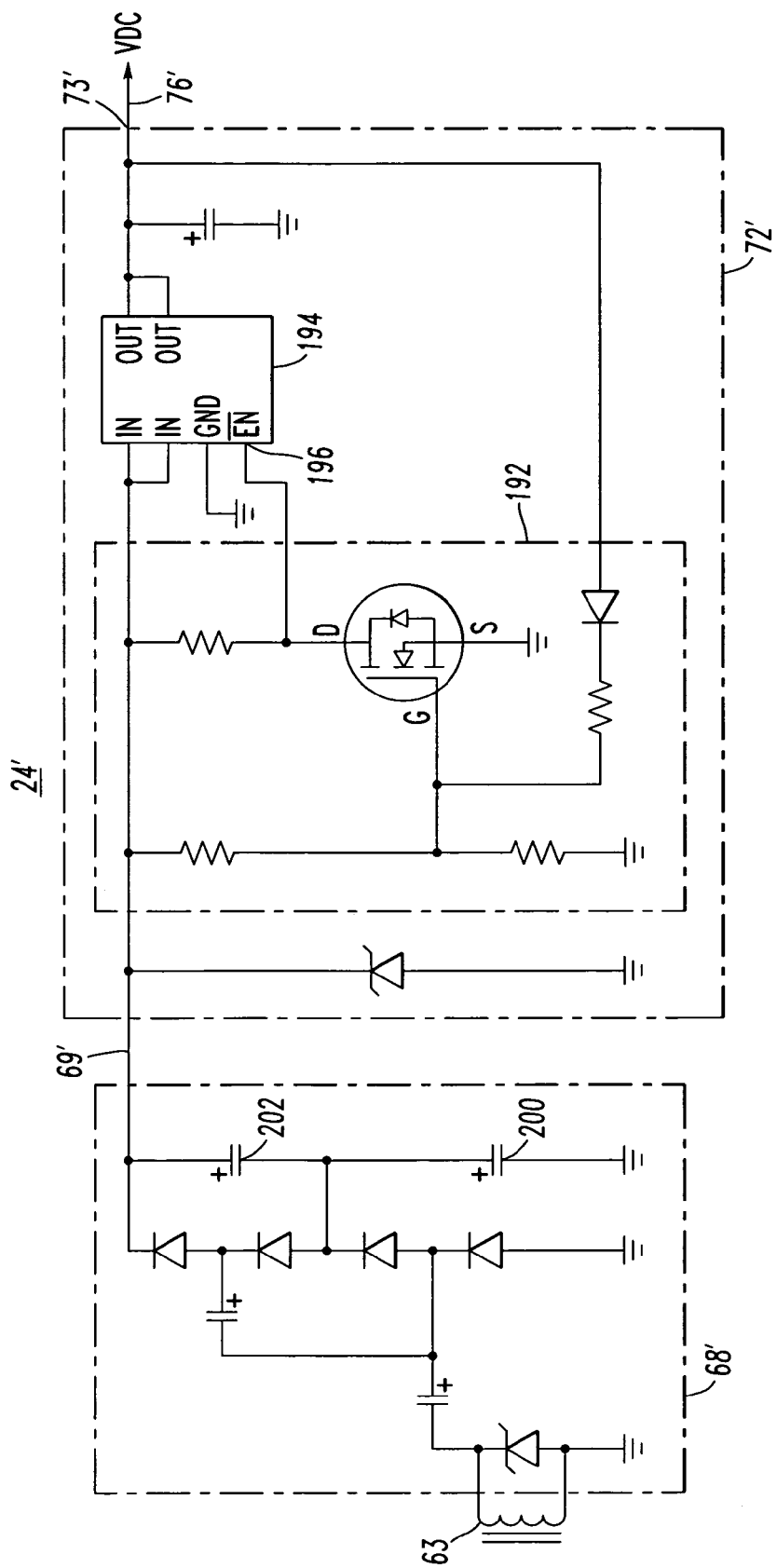
FIG. 12 is a block diagram in schematic form of the power supply of FIG. 11.

The power supply 24' includes a coil 8' having an output 63 with an alternating current voltage 66, a voltage multiplier circuit, such as a voltage doubler circuit 68', having an input electrically interconnected with the coil output 63 and an output with a direct current voltage 69', and a voltage regulator 72' having at least one output 73' with the at least one voltage 76'. As shown in FIG. 12, the power supply voltage regulator 72' includes a circuit 192 adapted to monitor the direct current voltage 69' and disable a voltage regulator circuit 194 when the direct current voltage 69' is below a predetermined value (e.g., without limitation, 3.5 VDC). Otherwise, the EN/(enable) input 196 of the voltage regulator circuit 194 is pulled low to enable the same to source the voltage 76'.

Figure 13:
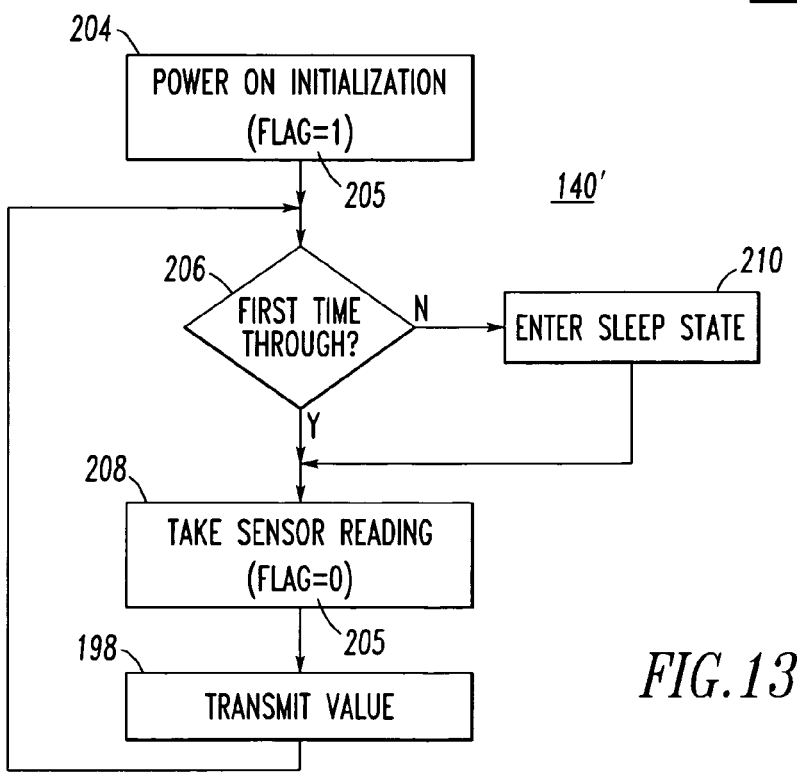
FIG. 13 is a flowchart of software executed by the processor of FIG. 11.

FIG. 13 shows the routine 140' executed by the processor 88' of FIG. 11. The processor software, such as routine 140', may conclude that the sensor 2', which is a slave node, is going to sleep after a transmission, or alternately, as is discussed below in connection with Example 23, may monitor its power supply 24' and, similar to a brown out function, turn off when power is too low to maintain operation. FIG. 13 shows the example where the processor 88' goes to sleep, at 210, after each transmission, at 198. In turn, the processor 88' wakes up after an internal time period has elapsed. The circuit 192 of FIG. 12 ensures that the charge (i.e., Q=CV) of the capacitors 200,202 (FIG. 12) is sufficiently large, such that the DC voltage 69' is suitably maintained to support at least one maximum length transmission of the wireless signal 130' (FIG. 11).

The routine 140' first determines a power on initialization state of the processor 88' at 204 and sets a flag 205. If the flag 205 is set at 206, then execution resumes at 208, which responsively inputs the sensed temperature characteristic of the power bus 4' from the sensor 44'. This step also clears the flag 205. Next, at 198, the routine 140' outputs a signal to the radio transceiver 50' to transmit as the wireless signal 130' before sleeping in the low-power mode, at 210, since the flag 205 is now reset. Otherwise, for subsequent iterations of the routine 140', the processor 88' sleeps in the low-power mode at 210 before inputting a sensed temperature characteristic of the power bus 4' from the sensor 44' and outputting the signal to the radio transceiver 50' to transmit as the wireless signal 130' before sleeping again in the low-power mode at 210.

The processor 88' is preferably adapted to wake up from the low-power mode, at 210, after an internal timer (not shown) has elapsed.

In this example of FIG. 13, the routine 140' is adapted to sleep in the low-power mode, at 210, after (a) waking up from the low-power mode to take a sensor reading at 208, and after (b) outputting, at 198, to the radio transceiver 50' to transmit the single wireless signal 130'.

EXAMPLE 22

As an alternative to Example 21 and FIG. 13, where the power supply 24' is relatively more robust, or where the power output needs are relatively less, the processor 88' may go to sleep after two or more transmissions of two or more wireless signals.

EXAMPLE 23

As an alternative to Examples 21 and 22, where the power supply 24' cannot provide, for example, at least about 2.8 VDC continuously, circuit 192 will disable the voltage regulator 194 resulting in the processor 88' powering down. When the DC voltage 69' (FIG. 12) is above a suitable predetermined value, the processor 88' will then enter the power on initialization (204 of FIG. 13) and execute code. The number of transmissions, in this case, will depend on the rate of charge of the capacitors 200,202.

EXAMPLE 24

Alternatively, as a more specific example of Example 22, the routine 140' may be adapted to sleep in the low-power mode, at 210, after (a) waking up from the low-power mode to take a sensor reading at 208, after (b) inputting a first sensed temperature characteristic of the power bus 4' from the sensor 44' at 208, after (c) outputting a first corresponding signal to the radio transceiver 50' to transmit as a first wireless signal 130', after (d) inputting a second sensed temperature characteristic of the power bus 44' from the sensor 44', and after (e) outputting a second corresponding signal to the radio transceiver 50' to transmit as a second wireless signal 130'.

Although the radio transceivers 50,110,50' employ respective processors 88,122,88', it will be appreciated that a combination of one or more of analog, digital and/or processor-based circuits may be employed.

The disclosed sensor devices 2,2' are relatively easy to install for new or retrofit applications, since they can be placed on the respective power bus bars 4,4'.

Figure 14:
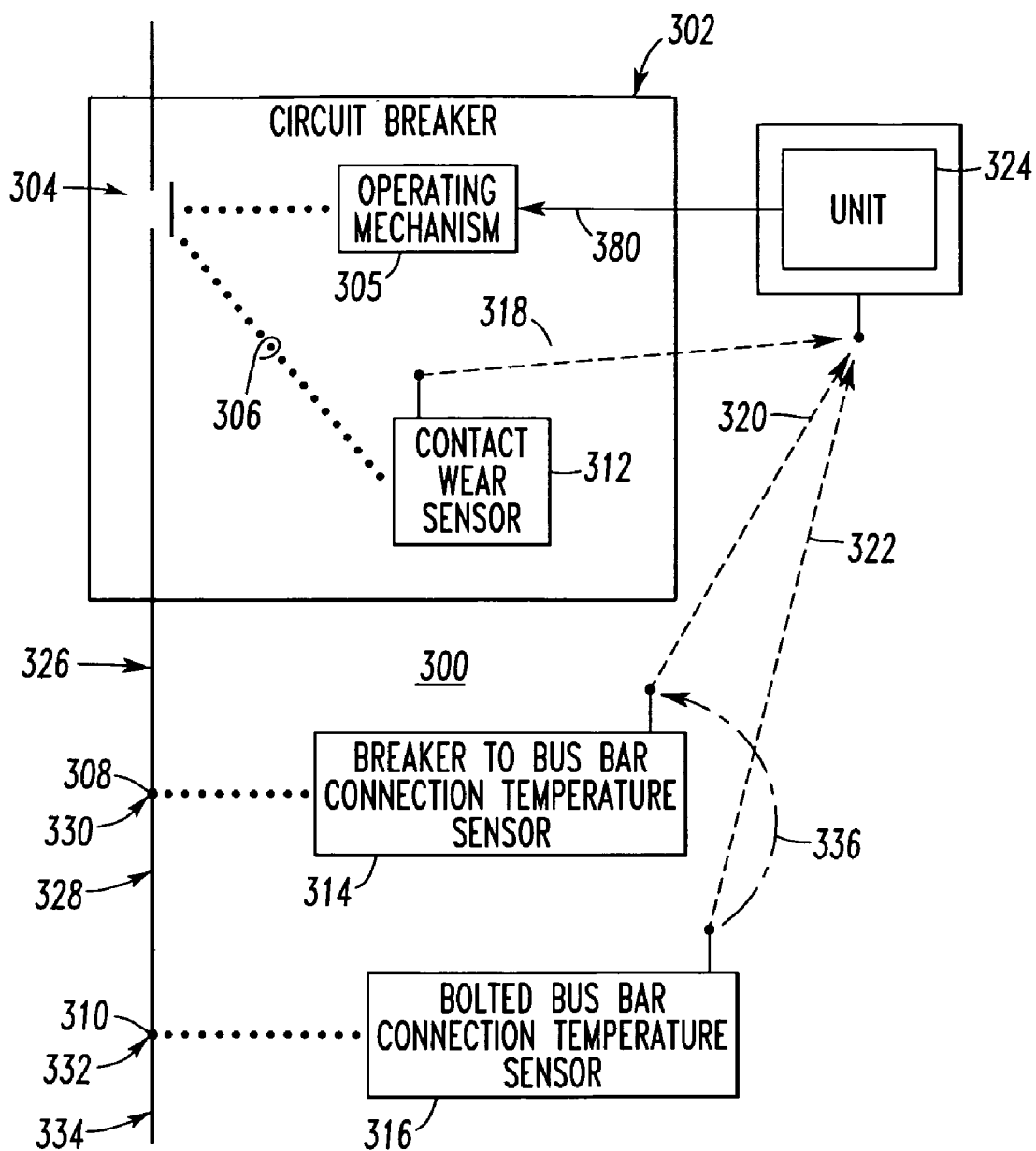
FIG. 14 is a block diagram of a wireless system including wireless sensors and a medium voltage circuit breaker in accordance with the present invention.

Referring to FIG. 14, a system 300 displays information from or controls an electrical switching apparatus, such as the example medium-voltage circuit breaker 302. The circuit breaker 302 includes conventional separable contacts 304, a conventional operating mechanism 305 and a plurality of conditions, such as contact wear 306, a first temperature 308 and a second temperature 310, among others (not shown). Although a double break contact configuration is shown, a single break contact configuration may be employed. Although a single pole is shown, plural poles may be employed. For example, for a typical three-phase power system, three poles would be employed. A plurality of sensors 312,314,316 are structured to sense at least some of the conditions, such as the respective example circuit breaker conditions 306,308,310, and communicate such sensed conditions over corresponding wireless signals 318,320,322, respectively. A unit 324 is operatively associated with the circuit breaker 302 and is structured to receive the wireless signals 318,320,322 and display information corresponding to at least some of the sensed conditions and/or to control the circuit breaker 302 based upon one or more of the sensed conditions.

EXAMPLE 25

The sensor 312 is a contact wear sensor structured to sense the contact wear 306 of the separable contacts 304 as one of the sensed conditions. The temperature sensors 314,316 are structured to sense the respective circuit breaker temperatures 308,310 as some of the sensed conditions. For example, as part of the system 300, the example circuit breaker 302 includes a conductor 326, a bus bar 328 and a circuit breaker-bus bar connection 330. The first temperature 308 corresponds to the circuit breaker-bus bar connection 330. Also, the bus bar 328 includes a bolted bus bar connection 332 to another bus bar 334. The second temperature 310 corresponds to the bolted bus bar connection 332.

EXAMPLE 26

Although any suitable wireless temperature sensors may be employed, the temperature sensors 314,316 may be the same as or similar to the self-powered wireless power bus temperature sensor device 2, the wireless power bus sensor 2' or the wireless power bus sensor 92 disclosed herein. For example, the temperature sensor may be self-powered by, for instance, the current flowing through an electrical switching apparatus or a bus bar. The temperature of the bus bar, for example, is measured where the temperature rise is caused by $I^2R$ heating. If there is no current, then there is no need to be self-powered, since there would be no corresponding temperature rise.

For example, a relatively small coil may be positioned near the bus bar, in order that the flux produced by the bus current induces a relatively small voltage. This voltage is employed to power the sensor and the corresponding transmitter. The entire sensor/transmitter circuit may be coupled to the bus bar, since electrical isolation is accomplished by the wireless (e.g., radio frequency (RF)) link.

EXAMPLE 27

For example, the wireless communications may be RF communications and may be provided by a suitable RF communication network, such as a low-rate wireless personal area network (LR-WPAN), which is a low power short range RF communication network.

EXAMPLE 28

The wireless signals 318,320,322 may be, for example, RF communications as provided over a suitable mesh network. A preferred communication network is a ZigBee™ Alliance standard (Zigbee) network, which employs flexible, multi-hop networking that can follow several architectural topologies, to ensure that a network functions with maximum efficiency and reliability.

As shown with the wireless signal 336 of FIG. 14, for maximum flexibility and reliability, Zigbee's mesh topology, wherein each node (i.e., the various sensors 312,314,316) is in direct communication with its immediate neighbor node(s), is an option. If a single node fails for any reason, including the introduction of relatively strong RF interference, then the RF messages are automatically routed through alternate paths. Hence, the wireless signal 322 may be sent directly from the sensor 316 to the unit 324.

EXAMPLE 29

Figure 15:
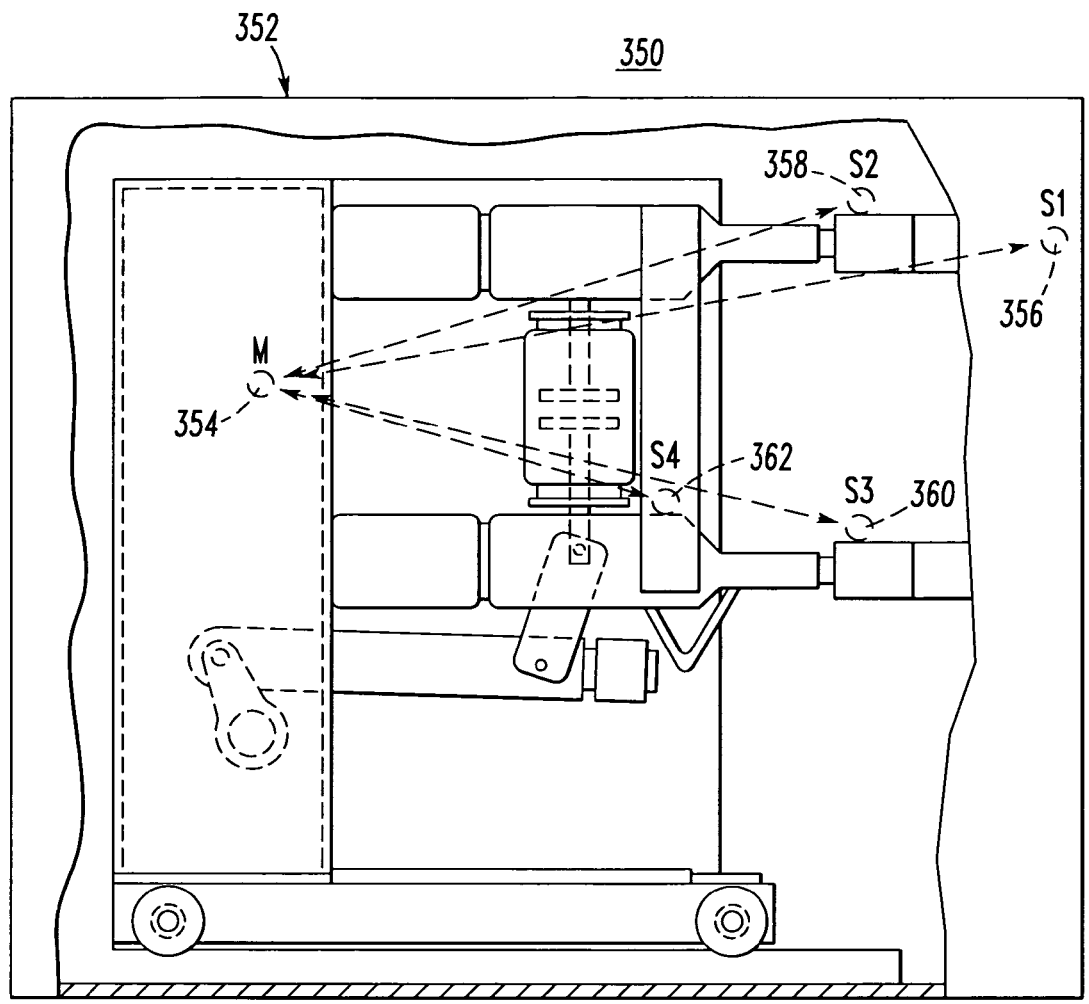
FIG. 15 is a block diagram of a master-slave wireless system including wireless sensors and a medium voltage circuit breaker in accordance with an embodiment of the invention.

FIG. 15 shows a system 350 which may be somewhat similar to the system 300 of FIG. 14. The master-slave RF system 350 includes a medium voltage circuit breaker 352, a unit 354 (M) and four wireless sensors 356,358,360,362 (S1-S4) mounted on the circuit breaker 352. In this example, the sensors 356,358,360,362 are slave devices, the unit 354 forms a master device, and each of the slave devices communicates directly with the master device. This master-slave system 350 is a one-way configuration, since the master unit 354 does not communicate to the slave sensors 356,358,360,362. Instead, the slaves randomly and spontaneously communicate to the master. The slaves send both circuit breaker wellness data and their addresses or serial numbers.

EXAMPLE 30

Sensor 356 (S1) is a temperature-transmitting sensor that is located, for example, in the switchgear lineup near a bolted bus bar connection. Sensor 358 (S2) and 360 (S3) are located near the circuit breaker-to-bus bar connection and measure temperature at this point.

The final sensor 362 (S4) is located near the moving end of the vacuum bottle circuit interrupting device and measures the displacement of the point on the moving member from a fixed reference when the circuit breaker is closed. A change in this distance is related to contact wear. For example, travel change in an electrical switching apparatus, such as a circuit breaker, may be limit checked by an optical detecting mechanism. For example, a detector may indicate if the travel has lengthened to an out-of-specification value by cutting a light beam if contact wear is unacceptably high. An optical travel limit sensor may be employed for contact wear.

In this example, sensors 356,358,360,362 each transmit to the master unit 354 (M).

EXAMPLE 31

Figure 16:
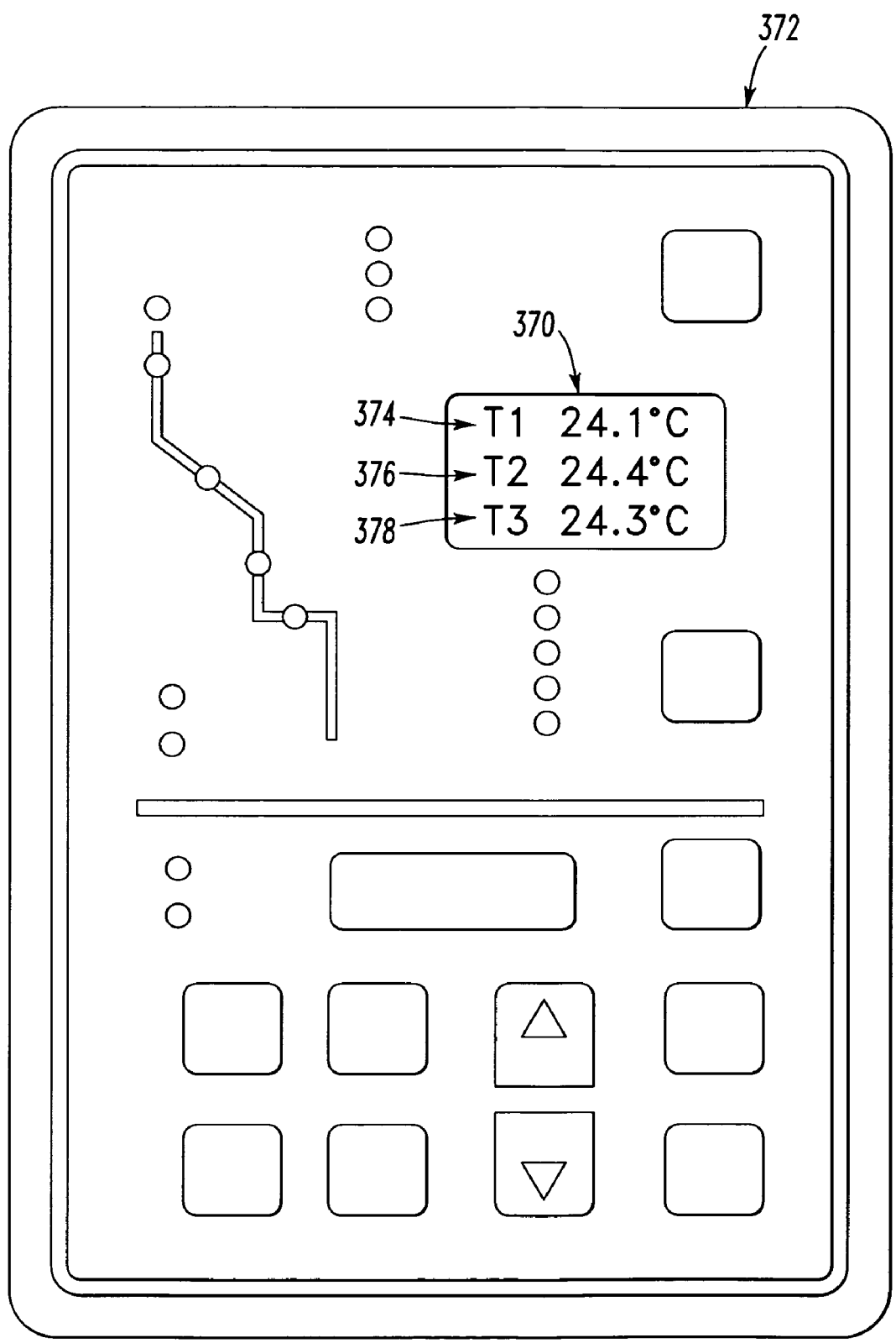
FIG. 16 is vertical elevation view of a temperature sensor readout on a trip unit in accordance with another embodiment of the invention.

FIG. 16 shows a temperature sensor display 370 on an electronic trip unit 372, which may function as one of the units 324 (FIG. 14) or 354 (FIG. 15). The display 372 includes three temperature values 374 (T1),376 (T2),378 (T3), which correspond to the temperature conditions as sensed by the temperature sensors 356,358,360, respectively, of FIG. 15. These temperature sensors are assumed to be associated with one phase of the circuit. A similar display would be provided for the other two phases of a three-phase system. This electronic trip unit 372 in general and the display 370, in particular, are external to a corresponding circuit breaker (not shown), such as the circuit breaker 352 of FIG. 15.

EXAMPLE 32

Although not shown in FIG. 16, the trip unit 372 may also display information from the contact wear sensor 362 (S4) of FIG. 15.

EXAMPLE 33

As shown with the unit 324 of FIG. 14, the unit 324 may be structured to receive a trip signal from at least one of the sensors, such as one or both of the temperature sensors 314, 316, and actuate the operating mechanism 305, as at 380, to trip open the separable contacts 304. For example, this may occur when one of the temperatures as reported by the wireless signals 320,322 exceeds a predetermined value (e.g., representing an unsafe bus bar temperature).

EXAMPLE 34

Further to Example 33, the condition sensed by the temperature sensors 314,316 may, thus, include protection (e.g., trip) information.

EXAMPLE 35

In FIG. 16, the trip unit 372 may display information from the various sensors 356,358,360,362 (FIG. 15) including one or more of metering, monitoring, alarming and annunciating information.

EXAMPLE 36

By employing a mesh type network, rather than a simple master-slave system 350, as was shown in FIG. 15, a more robust RF communication system may be formed. The system 350 is a star network. This provides efficient localized (one-hop) communication. In this star network, a central access point (or master) 354 controls communications between nodes (or slaves), such as 356,358,360,362. However, when physical or RF interference blocks communication between the access point 354 and any of the nodes 356, 358,360,362, the star network cannot recover until the source of the interference is removed or the system 350 selects and migrates to an alternate frequency channel. While relatively simple, this topology requires that each of the slaves 356,358, 360,362 is able to communicate directly back to the master 354.

Examples of a mesh type network include a Zigbee system and ANSI 802.15.4. The mesh type network may be a masterless system, with information passing to and from devices through multiple paths or routing. The advantage of the mesh type network is that reliable communication requires only that a single communication path is employed between each pair of devices. This path can include routing of the signal through other devices. Hence, each device does not need to be able to communicate directly to a single selected device as in a master-slave system.

Figure 17:
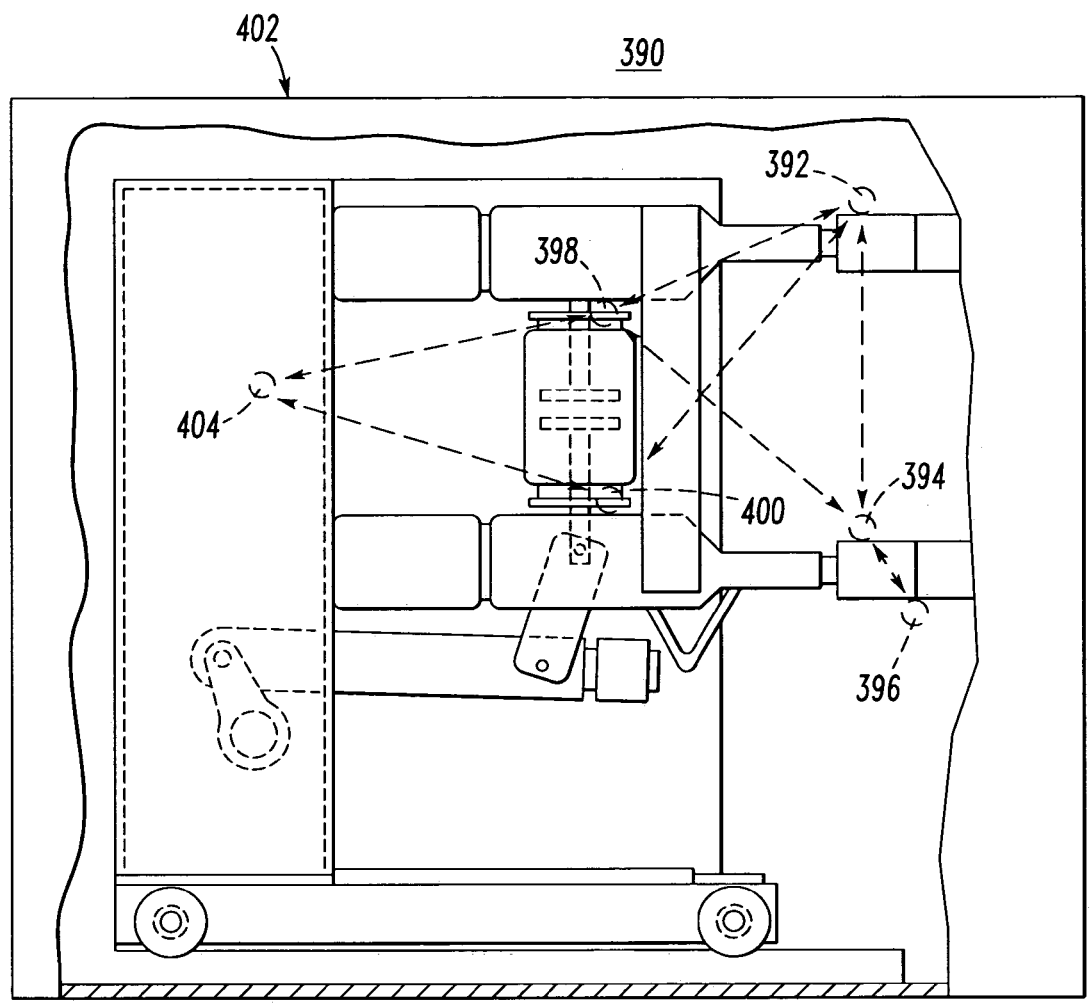
FIG. 17 is a block diagram of a mesh wireless communication system including wireless sensors and a medium voltage circuit breaker in accordance with another embodiment of the invention.

FIG. 17 shows a mesh RF communication system 390 including wireless sensors 392,394,396,398,400 mounted on a medium voltage circuit breaker 402. These sensors and the unit 404 form a plurality of mesh type devices. For example, one or more of the sensors, such as 392,394,398,400, communicate directly with a plurality of the other sensors. A plurality of the sensors, such as 398,400, communicate directly with the unit 404. Only one of the example sensors 396 communicates with only one other sensor 394.

The unit 404 may advantageously be disposed on or proximate the front of the circuit breaker 402 and may include a display, such as display 370 of FIG. 16, to provide readout of some or all of the sensor data. The major difference between the system 390 and the system 350 of FIG. 15 is that each of the sensors 392,394,396,398,400 does not need to be able to directly communicate with the unit 404.

EXAMPLE 37

Figure 18:
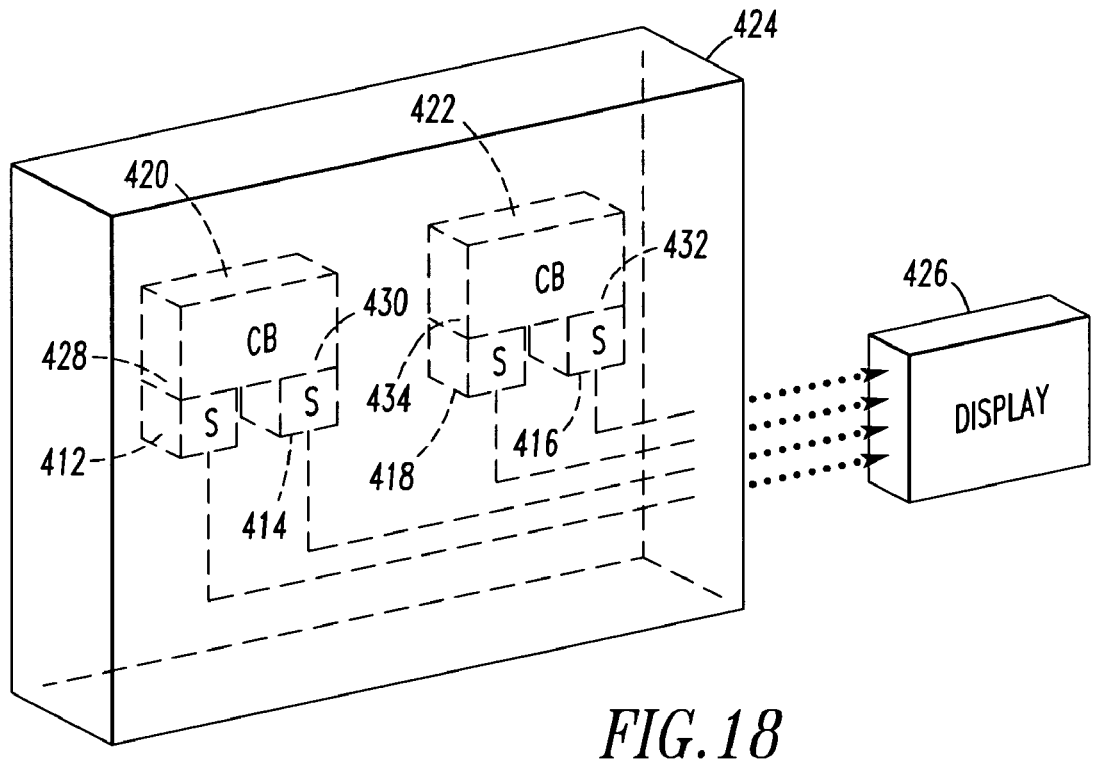
FIG. 18 is an isometric view of a plurality of wireless sensors of a plurality of circuit breakers of a switchgear assembly or a motor control center wirelessly communicating with a display separated from the circuit breakers in accordance with another embodiment of the invention.

FIG. 18 shows a system 410 including a plurality of wireless sensors 412,414,416,418 of a plurality of circuit breakers 420,422 of an electrical distribution enclosure 424 (e.g., without limitation, a switchgear assembly; a motor control center; a panelboard; a load center) wirelessly communicating with a display 426, which is separated from the circuit breakers 420,422 and, in this example, from the enclosure 424. The sensors 412,414,416,418 are structured to sense the respective conditions 428,430,432,434 of the circuit breakers 420, 422 for display by the display 426.

EXAMPLE 38

Figure 19:
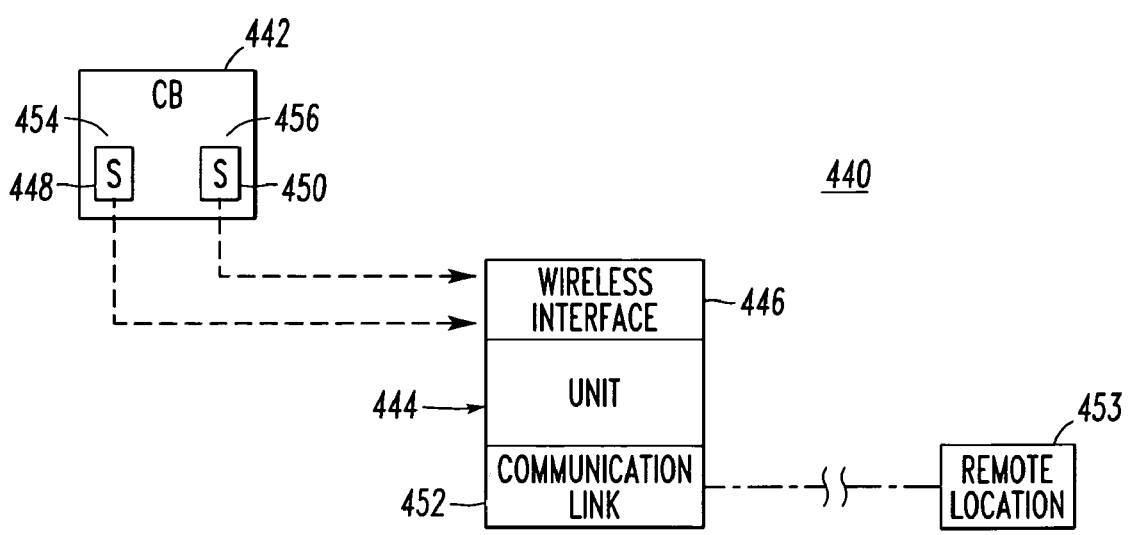
FIG. 19 is a block diagram of a circuit breaker including a unit having a wireless interface to a plurality of wireless sensors and a communication link structured to communicate information from the wireless sensors to a remote location in accordance with another embodiment of the invention.

FIG. 19 shows a system 440 including circuit breaker 442 having a unit 444 with a wireless interface 446 to a plurality of wireless sensors 448,450 and a communication link 452 structured to communicate information from the wireless sensors 448,450 to a remote location 453. The sensors 448, 450 are structured to sense the conditions 454,456, respectively, of the circuit breaker 442. The unit 444 may be separated, as shown, from the circuit breaker 442.

EXAMPLE 39

Although one circuit breaker 442 is shown, the sensors 448,450 may be associated with more than one circuit breaker.

EXAMPLE 40

Alternatively, the unit 444 may be internal to the circuit breaker 442.

EXAMPLE 41

The communication link 452 may include, for example, a modem and a telephone line, or an Ethernet transceiver and an Ethernet cable.

EXAMPLE 42

As an alternative to the mesh network of the system 390 of FIG. 17 or the system 350 employing the star network of FIG.

15, the RF communications may be provided over a star-mesh network (not shown). In a star-mesh topology, a star master is powered by a control voltage, while the slave nodes may be self-powered. The star master is part of a mesh network that allows communication to all of the nodes. Should a mesh node fail, then alternate routing paths will automatically be discovered. A key feature of IEEE 802.15.4 is the concept of meshing. In the example star-mesh network, rather than requiring each node to communicate to a single node (e.g., the master 354 of FIG. 15), the node only needs to communicate to a suitable adjacent device.

The combined star-mesh topology or superstar configuration combines the benefits of both mesh and star topologies. This is preferably applied in cluster type networks, where the local star nodes are relatively simpler nodes that may be parasitically powered, which communicate to full function nodes that are always powered and have the ability to communicate over a mesh. As such, the superstar topology provides both efficiency and flexibility.

EXAMPLE 43

Although separable contacts 304 are disclosed, suitable solid state separable contacts may be employed. For example, the circuit breaker 302 includes a suitable circuit interrupter mechanism, such as the separable contacts 304 that are opened and closed by the operating mechanism 305, although the invention is applicable to a wide range of circuit interruption mechanisms (e.g., without limitation, solid state or FET switches; contactor contacts) and/or solid state based control/protection devices (e.g., without limitation, drives; soft-starters).

The disclosed systems 300,350,390,410,440, which employ wireless communications, have many advantages including: (1) isolation and immunity from damaging voltage transients; and (2) the ability, due to the low power LR-WPAN communications, to add communications to additional devices, such as circuit breakers or circuit breaker sensors, without requiring external control power or additional wiring.

While for clarity of disclosure reference has been made herein to the exemplary display action 138 or to the display 370 for displaying temperature, current, contact wear or other sensor information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for displaying information from or for controlling electrical switching apparatus, said system comprising:
at least one electrical switching apparatus comprising separable contacts and a plurality of conditions;
a plurality of sensors structured to sense at least some of the conditions of said at least one electrical switching apparatus and communicate said sensed at least some of the conditions over corresponding wireless signals; and
a unit operatively associated with said at least one electrical switching apparatus, said unit structured to receive said corresponding wireless signals and display information corresponding to at least one of said sensed at least some of the conditions or to control said at least one electrical switching apparatus based upon at least one of said sensed at least some of the conditions.

2. The system of claim 1 wherein said at least one electrical switching apparatus is a circuit breaker.

3. The system of claim 1 wherein said at least one electrical switching apparatus comprises a plurality of circuit interrupters of a switchgear assembly or a motor control center.

4. The system of claim 1 wherein one of said sensors is structured to sense a temperature of said at least one electrical switching apparatus as one of said sensed at least some of the conditions.

5. The system of claim 4 wherein said at least one electrical switching apparatus is a circuit breaker including a bus bar and a circuit breaker-bus bar connection; and wherein the temperature of said circuit breaker corresponds to said circuit breaker-bus bar connection.

6. The system of claim 5 wherein said bus bar includes a bolted bus bar connection; and wherein the temperature of said circuit breaker corresponds to said bolted bus bar connection.

7. The system of claim 1 wherein one of said sensors is structured to sense contact wear of the separable contacts of said at least one electrical switching apparatus as one of said sensed at least some of the conditions.

8. The system of claim 1 wherein said unit is external to said at least one electrical switching apparatus and includes a display; and wherein said displayed information is output on said display.

9. The system of claim 1 wherein said at least one electrical switching apparatus is one electrical switching apparatus; and wherein said unit is internal to said one electrical switching apparatus and includes a communication link structured to communicate said displayed information to a remote location.

10. The system of claim 9 wherein said communication link includes a modem and a telephone line.

11. The system of claim 9 wherein said communication link includes an Ethernet transceiver and an Ethernet cable.

12. The system of claim 1 wherein said sensors are a plurality of wireless slave devices; wherein said unit forms a master device; and wherein each of said wireless slave devices wirelessly communicates directly with said master device.

13. The system of claim 1 wherein said sensors and said unit form a plurality of wireless mesh type devices; wherein at least one of said sensors wirelessly communicates directly with another one of said sensors; and wherein at least one of said sensors wirelessly communicates directly with said master device.

14. The system of claim 1 wherein said at least one electrical switching apparatus includes current flowing therethrough; and wherein one of said sensors includes a power supply that is energized by said current.

15. The system of claim 1 wherein said at least one electrical switching apparatus includes a bus bar and current flowing through said bus bar; and wherein one of said sensors includes a power supply that is energized by said current.

16. The system of claim 1 wherein said sensors include a first sensor and a second sensor; wherein said sensed at least one of the conditions includes a first sensed condition and a second sensed condition; wherein said first sensor is structured to sense a temperature of said at least one electrical switching apparatus as said first sensed condition; and wherein said second sensor is structured to sense contact wear of the separable contacts of said at least one electrical switching apparatus as said second sensed condition.

17. The system of claim 1 wherein said at least one electrical switching apparatus is a circuit breaker further comprising a trip unit; wherein said sensors include a contact wear sensor structured to sense contact wear of the separable contacts of said circuit breaker as one of said conditions; and wherein said unit of said system is part of the trip unit of said circuit breaker.

18. The system of claim 1 wherein said at least one electrical switching apparatus is a circuit breaker further comprising a trip unit; wherein said sensors are structured to sense the conditions of said circuit breaker; and wherein said unit of said system is part of the trip unit of said circuit breaker.

19. The system of claim 18 wherein said trip unit is structured to receive a trip signal from at least one of said sensors.

20. The system of claim 1 wherein said at least one electrical switching apparatus comprises at least one circuit breaker; wherein said sensors are structured to sense the conditions of said at least one circuit breaker; and wherein said unit is separated from said at least one circuit breaker.

21. The system of claim 1 wherein said displayed information includes at least one of metering, monitoring, alarming and annunciating information.

22. The system of claim 1 wherein said sensed at least some of the conditions includes protection information.

23. The system of claim 1 wherein said wireless signals are radio frequency signals.

24. The system of claim 1 wherein said unit is structured to control said at least one electrical switching apparatus based upon said at least one of said sensed at least some of the conditions.

* * * * *

UNITED STATES PATENT AND TRADEMARK OFFICE
CERTIFICATE OF CORRECTION

| | | |
|---|---|---|
| PATENT NO. | : 7,417,554 B2 | Page 1 of 1 |
| APPLICATION NO. | : 11/338349 | |
| DATED | : August 26, 2008 | |
| INVENTOR(S) | : James J. Benke et al. | |

It is certified that error appears in the above-identified patent and that said Letters Patent is hereby corrected as shown below:

Front Page, Column 1, INID code (73) Assignee, "Gaton" should read --Eaton--.

Signed and Sealed this
First Day of January, 2013

David J. Kappos
*Director of the United States Patent and Trademark Office*